United States Patent
Tanaka et al.

(10) Patent No.: US 10,101,524 B2
(45) Date of Patent: Oct. 16, 2018

(54) DISPLAY APPARATUS

(71) Applicant: Japan Display Inc., Tokyo (JP)

(72) Inventors: Hiromichi Tanaka, Tokyo (JP);
Takeshi Kaneki, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/787,241

(22) Filed: Oct. 18, 2017

(65) Prior Publication Data
US 2018/0120498 A1    May 3, 2018

(30) Foreign Application Priority Data

Oct. 27, 2016 (JP) ................... 2016-210883

(51) Int. Cl.
| | | |
|---|---|---|
| *F21V 9/14* | (2006.01) | |
| *F21V 8/00* | (2006.01) | |
| *G02F 1/1333* | (2006.01) | |

(52) U.S. Cl.
CPC ........... *G02B 6/0088* (2013.01); *G02B 6/005* (2013.01); *G02B 6/0056* (2013.01); *G02B 6/0068* (2013.01); *G02F 1/133308* (2013.01); *G02F 2001/133314* (2013.01); *G02F 2001/133317* (2013.01); *G02F 2001/133331* (2013.01); *G02F 2202/28* (2013.01)

(58) Field of Classification Search
None
See application file for complete search history.

(56) References Cited

U.S. PATENT DOCUMENTS

2015/0241731 A1    8/2015 Jeong et al.

FOREIGN PATENT DOCUMENTS

JP    2009-192769 A    8/2009

*Primary Examiner* — Vip Patel
(74) *Attorney, Agent, or Firm* — Michael Best & Friedrich LLP

(57) ABSTRACT

According to an aspect, a display apparatus includes: a display panel; a backlight device disposed on a back surface side of the display panel; an adhesive member bonding the display panel to the backlight device; and a housing covering a back surface side of the backlight device. The housing includes a bottom portion and a wall portion rising from a periphery of the bottom portion toward the display panel side. The adhesive member is disposed between the display panel and the wall portion.

10 Claims, 21 Drawing Sheets

DISPLAY APPARATUS

CROSS-REFERENCE TO RELATED APPLICATIONS

This application claims priority from Japanese Application No. 2016-210883, filed on Oct. 27, 2016, the contents of which are incorporated by reference herein in its entirety.

BACKGROUND

1. Technical Field

The present disclosure relates to a display apparatus.

2. Description of the Related Art

As a display apparatus, United States Patent Application Publication No. 2015/0241731, for example, discloses a transmissive liquid crystal display apparatus that displays an image on a display panel using light emitted from a backlight device disposed on a back surface side of the display panel.

A display apparatus having a narrower frame region has been desired, in which a frame region located at an outer periphery of a display region is narrowed.

SUMMARY

According to an aspect, a display apparatus includes: a display panel; a backlight device disposed on a back surface side of the display panel; an adhesive member bonding the display panel to the backlight device; and a housing covering a back surface side of the backlight device. The housing includes a bottom portion and a wall portion rising from a periphery of the bottom portion toward the display panel side. The adhesive member is disposed between the display panel and the wall portion.

DETAILED DESCRIPTION

Figure 1:
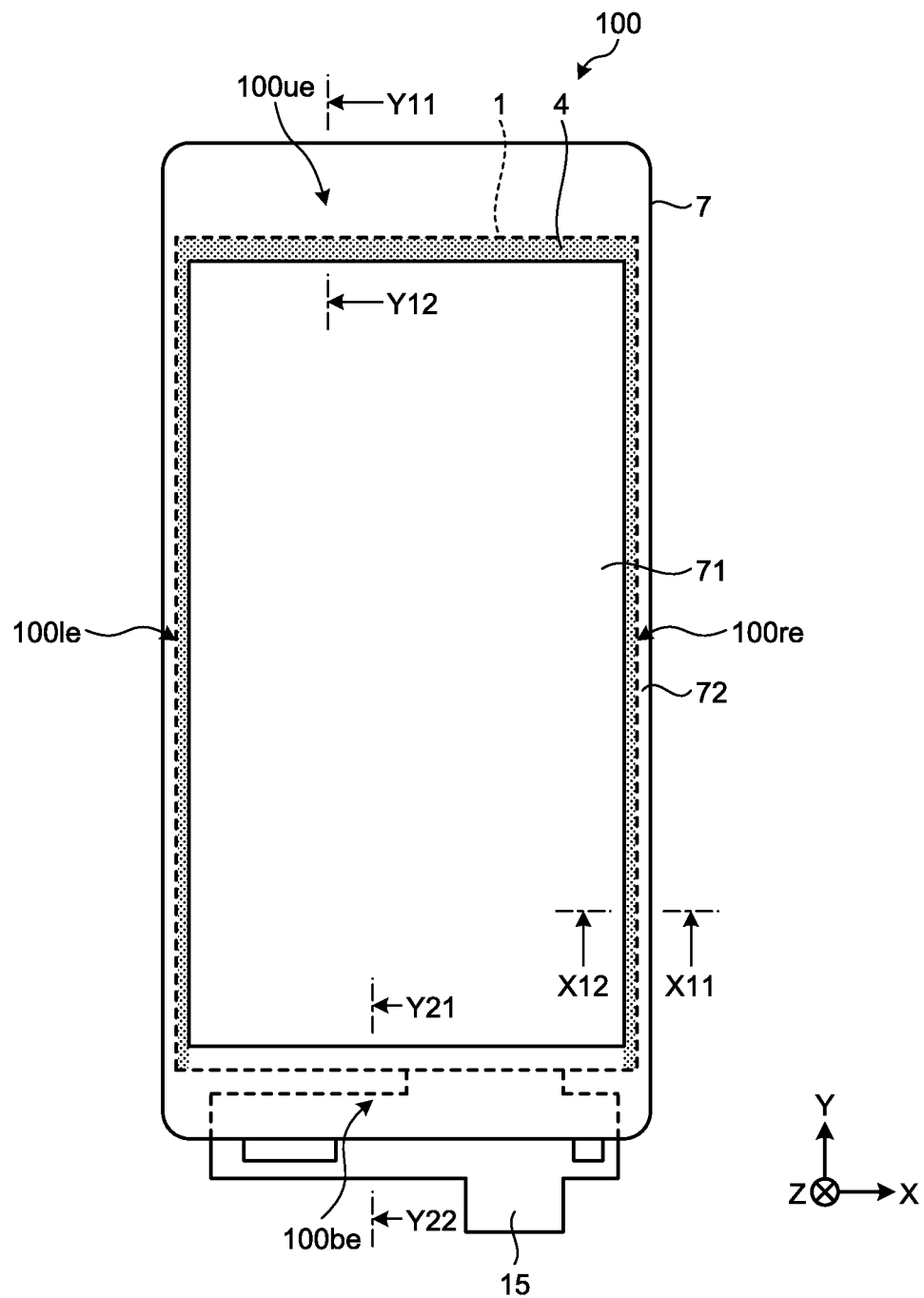
FIG. 1 is a plan view illustrating a configuration example of a display apparatus according to a first embodiment of the present disclosure.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art are naturally included in the scope of the disclosure. The drawings may possibly illustrate the width, the thickness, the shape, and the like of each unit more schematically than the actual aspect to simplify the explanation. These components, however, are given by way of example only and are not intended to limit interpretation of the disclosure. In the specification and the figures, components similar to those previously described with reference to a preceding figure are denoted by like reference numerals, and detailed explanation thereof will be appropriately omitted. In this disclosure, when an element is described as being "on" another element, the element can be directly on the other element, or there can be one or more elements between the element and the other element.

First Embodiment

Figure 2:
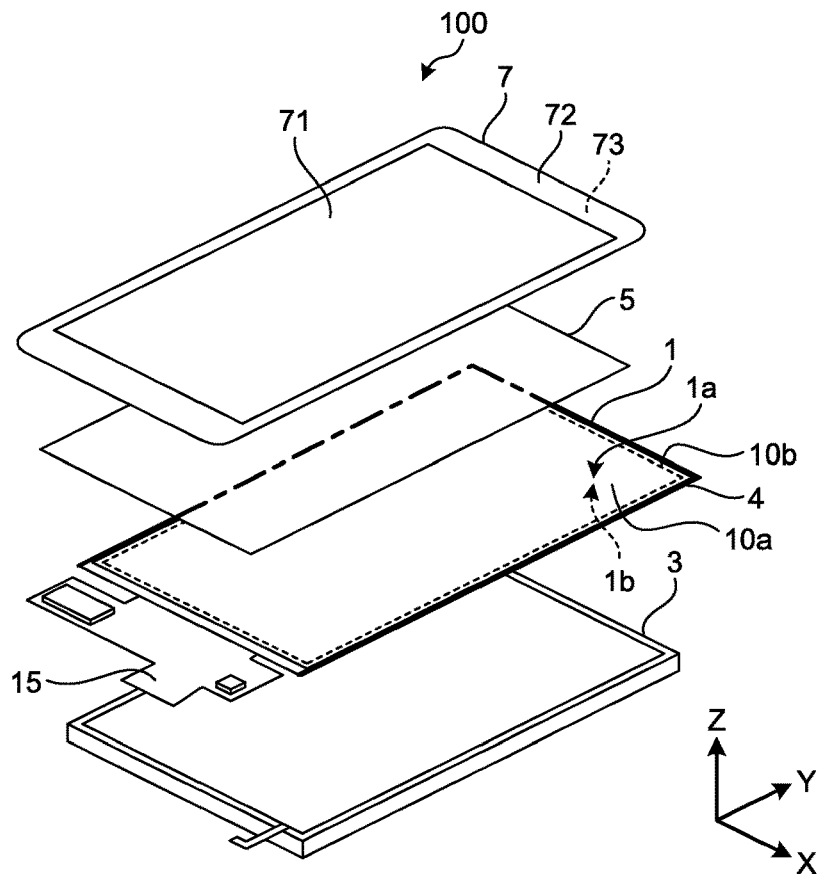
FIG. 2 is an exploded perspective view illustrating the configuration example of the display apparatus according to the first embodiment.
Figure 3:
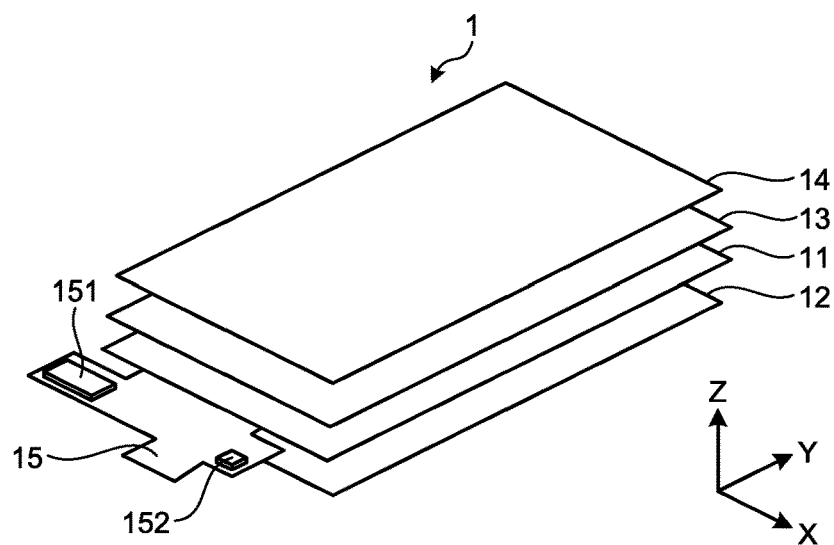
FIG. 3 is an exploded perspective view illustrating a configuration example of a display panel according to the first embodiment.
Figure 4:
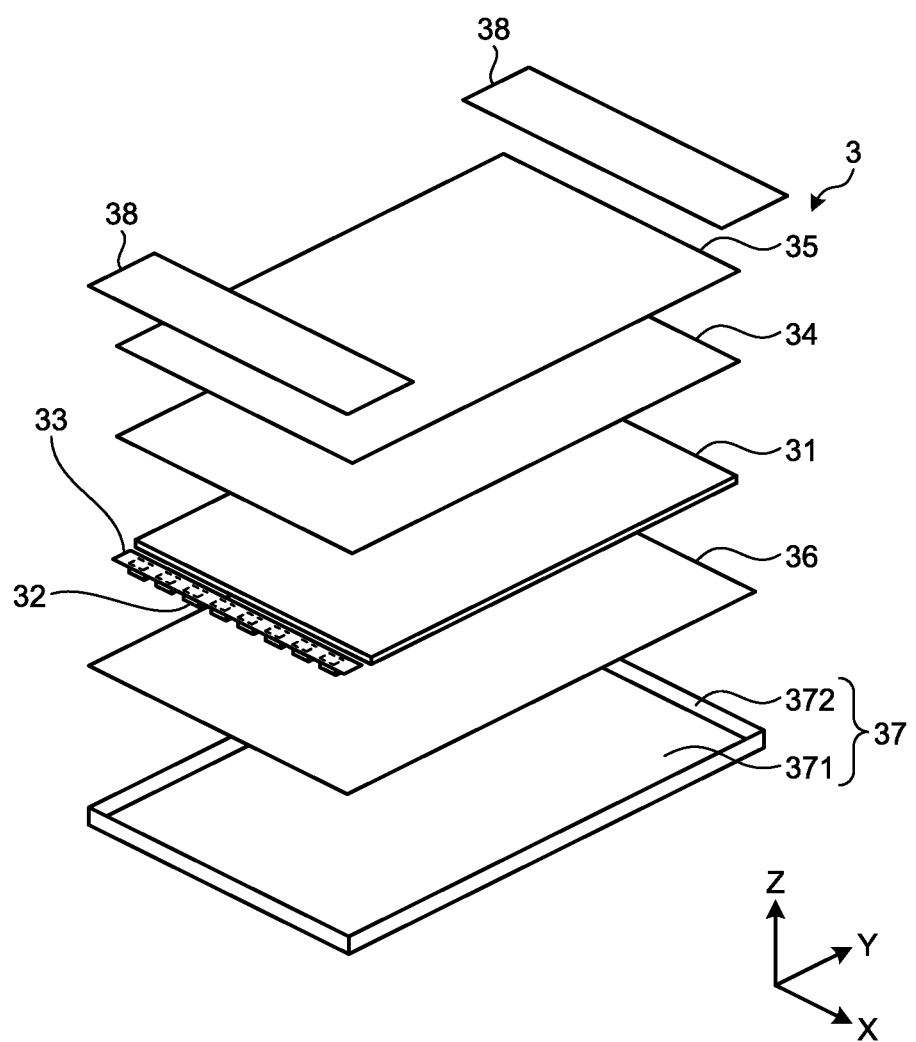
FIG. 4 is an exploded perspective view illustrating a configuration example of a backlight device according to the first embodiment.

FIG. 1 is a plan view illustrating a configuration example of a display apparatus according to a first embodiment of the present disclosure. FIG. 2 is an exploded perspective view illustrating the configuration example of the display apparatus according to the first embodiment. FIG. 3 is an exploded perspective view illustrating a configuration example of a display panel according to the first embodiment. FIG. 4 is an exploded perspective view illustrating a configuration example of a backlight device according to the first embodiment. In this specification, a surface of each component of the display apparatus on a side on which an image is displayed by the display panel (such as the upper side in FIG. 2) is referred to as a front surface or an upper surface, and a surface thereof on the opposite side of the side on which the image is displayed is referred to as a back surface or a lower surface. In this specification, a lateral direction in FIG. 1 is represented by an X-axis direction; a longitudinal direction in FIG. 1 is represented by a Y-axis direction; and a direction orthogonal to the XY-plane in FIG. 1 is represented by a Z-axis direction.

Figure 5:
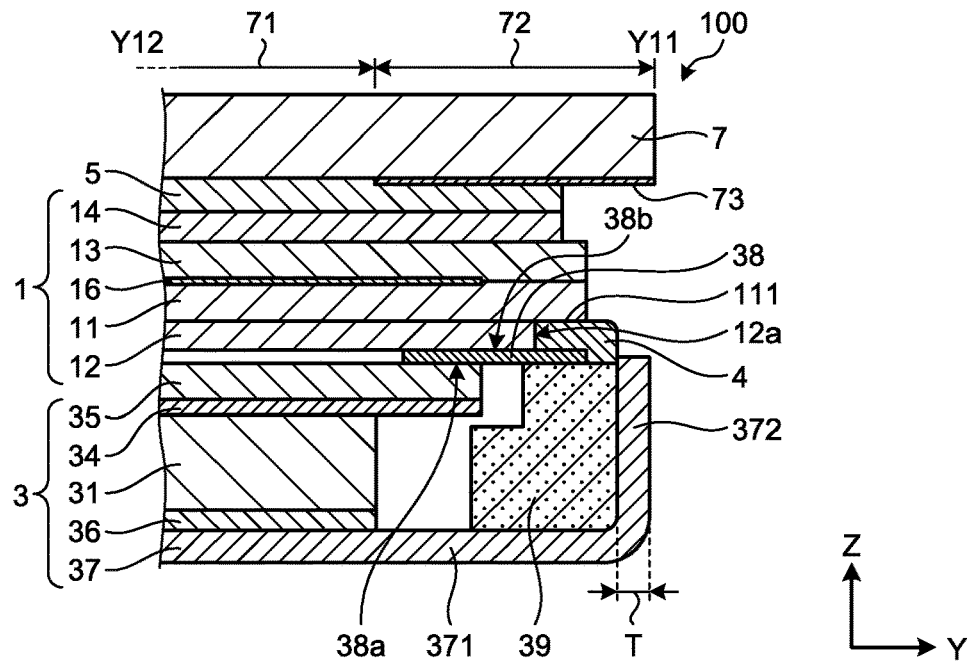
FIG. 5 is a partial sectional view of the display apparatus according to the first embodiment.
Figure 6:
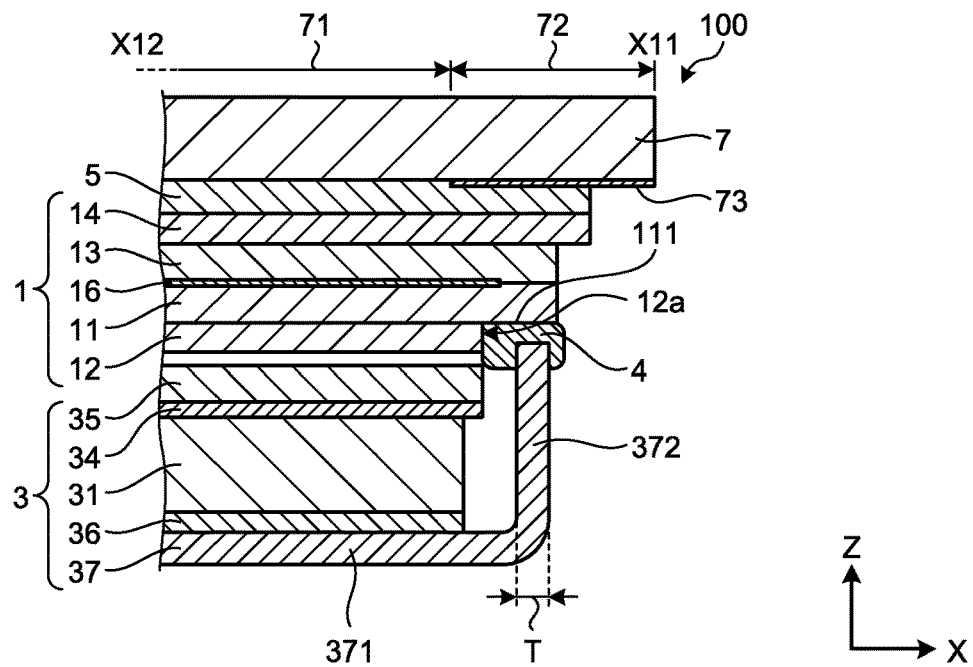
FIG. 6 is another partial sectional view of the display apparatus according to the first embodiment.

As illustrated in FIGS. 1 and 2, a display apparatus 100 includes a display panel 1, a backlight device 3, a cover panel 7, a light-shielding adhesive member 4, a translucent adhesive layer 5, and a housing 37 (refer to FIGS. 5 and 6, for example). The display panel displays an image. The backlight device 3 is disposed on a back surface 1b side of the display panel 1. The cover panel 7 is disposed on a front surface 1a side of the display panel 1. The light-shielding adhesive member 4 is disposed between the display panel 1 and the backlight device 3. The translucent adhesive layer 5 is disposed between the display panel 1 and the cover panel 7. The housing 37 covers a back surface side of the backlight device 3. The display apparatus 100 is, for example, a transmissive liquid crystal display apparatus.

The display panel 1 is rectangular in shape in a plan view (hereinafter referred to as a planar shape), and includes a display region 10a for displaying an image and a frame region 10b located at an outer periphery of the display region 10a. The frame region 10b is disposed to surround the display region 10a, for example. The display panel 1 displays an image on the display region 10a by selectively transmitting light, which is emitted from the backlight device 3, from the back surface 1b side to the front surface 1a side. The frame region 10b is shielded from light emitted from the backlight device 3. The frame region 10b overlaps a light-shielding portion 72 of the display apparatus 100 in a plan view.

Figure 7:
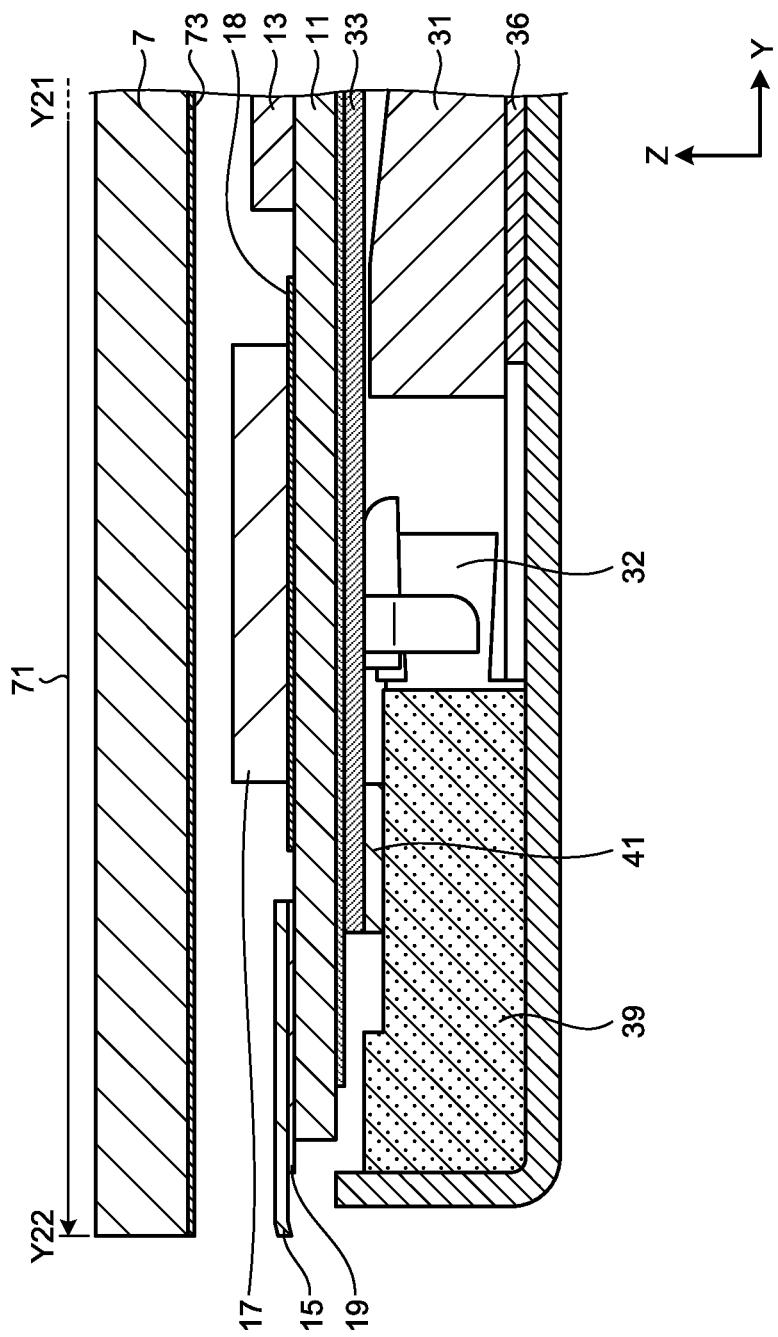
FIG. 7 is still another partial sectional view of the display apparatus according to the first embodiment.

FIGS. 5 to 7 are partial sectional views of the display apparatus 100 according to the first embodiment. Specifically, FIG. 5 illustrates a cross-section obtained by cutting an upper marginal portion 100ue of the display apparatus 100 illustrated in FIG. 1 along line Y11-Y12. FIG. 6 illustrates a cross-section obtained by cutting a right marginal portion 100re of the display apparatus 100 illustrated in FIG. 1 along line X11-X12. FIG. 7 illustrates a cross-section obtained by cutting a lower marginal portion 100be of the display apparatus 100 illustrated in FIG. 1 along line Y21-Y22.

As illustrated in FIG. 3 and FIGS. 5 to 7, the display panel 1 includes a first substrate 11, a first polarizing plate 12, a second substrate 13, a second polarizing plate 14, a drive control flexible printed circuit (FPC) 15, a liquid crystal layer 16, an integrated circuit (IC) chip 17, and anisotropic conductive films (ACFs) 18 and 19.

The first substrate 11 and the second substrate 13 are a pair of substrates sandwiching the liquid crystal layer 16. For example, the first substrate 11 is a flat plate having a rectangular planar shape, on which thin-film transistors and the like are formed. The second substrate 13 is a flat plate having a rectangular planar shape, on which color filters of red (R), green (G), and blue (B) corresponding to pixels and the like are formed. The first polarizing plate 12 adheres to a back surface of the first substrate 11, and polarizes light entering the display panel 1. The second polarizing plate 14 adheres to a front surface of the second substrate 13, and polarizes light exiting the display panel 1.

The liquid crystal layer 16 transmits or blocks incident light on a sub-pixel-by-sub-pixel basis by a voltage being applied between a common electrode and a pixel electrode which are not illustrated. Changing the voltage level of the pixel electrode adjusts a light transmission level in the liquid crystal layer 16 on a sub-pixel-by-sub-pixel basis. If the display mode of the display panel 1 is a horizontal electric field mode, the common electrode and the pixel electrode are formed on the first substrate 11, for example. If the display mode of the display panel 1 is a vertical electric field mode, the pixel electrode is formed on the first substrate 11, and the common electrode is formed on the second substrate 13.

As illustrated in FIG. 7, a front surface of the first substrate 11 is exposed from the second substrate 13 at the lower marginal portion of the display apparatus 100. The drive control FPC 15 and the IC chip 17 are mounted on the front surface of the first substrate 11 exposed from the second substrate 13. The IC chip 17 is equipped with, for example, a driver IC for driving the display panel 1. The IC chip 17 is mounted on the first substrate 11 with the ACF 18 interposed therebetween, for example. The drive control FPC 15 is also equipped with, for example, an IC chip 151 and an electronic component 152. The drive control FPC 15 is mounted on the first substrate 11 with the ACF 19 interposed therebetween, for example, and extends from the inside to the outside of the first substrate 11. The drive control FPC 15 supplies a signal needed for driving the display panel 1 to the first substrate 11 and the IC chip 17. The signal supplied from the drive control FPC 15 causes the display panel 1 to selectively transmit the light emitted from the backlight device 3 to display an image on the display region 10a.

The backlight device 3 is disposed on the back surface 1b side of the display panel 1, and emits the light toward the display panel 1. As illustrated in FIGS. 4 to 7, the backlight device 3 includes a light source unit 32, a light source control FPC 33, a light guide plate 31, a diffusion sheet 34, a prism sheet 35, a reflective sheet 36, double-sided tape 38, a resin portion 39, and an adhesive layer 41.

The light source unit 32 includes, for example, a plurality of light-emitting diodes (LEDs) as light source elements. The light source unit 32 emits light toward an incident surface of the light guide plate 31 by the LEDs emitting light. The light source unit 32 is coupled to the light source control FPC 33 through a connector and the like. The light source control FPC 33 supplies a signal to the light source unit 32 to emit light toward the light guide plate 31 and adjust the intensity of the emitted light. A lower surface of the light source control FPC 33 is bonded to the resin portion 39 and the light guide plate 31 through the adhesive layer 41, for example. The light source control FPC 33 extends from the inside to the outside of the housing 37.

The light guide plate 31 has a rectangular, planer shape. A side surface of the light guide plate 31 located at the lower marginal portion 100*be* of the display apparatus 100 (refer to FIG. 1) serves as the light incident surface of the light guide plate 31. A front surface of the light guide plate 31 serves as a light emitting surface of the light guide plate 31. The light guide plate 31 diffuses incident light from the incident surface inside the light guide plate 31, and emits the diffused light from the emitting surface. The light emitted from the emitting surface of the light guide plate 31 enters the diffusion sheet 34.

The diffusion sheet 34 is a transmissive optical element disposed on the emitting surface side of the light guide plate 31, and adjusts the optical properties of the light emitted from the emitting surface of the light guide plate 31. The prism sheet 35 is a transmissive optical element disposed on the emitting surface side of the light guide plate 31, and adjusts the optical properties of the light emitted from the emitting surface of the light guide plate 31. For example, the diffusion sheet 34 is disposed on the light guide plate 31, and the prism sheet 35 is disposed on the diffusion sheet 34. The diffusion sheet 34 and the prism sheet 35 are examples of an optical sheet that adjusts the optical properties of the light emitted from the emitting surface of the light guide plate 31.

The reflective sheet 36 is disposed on a back surface side of the light guide plate 31. The reflective sheet 36 reflects light leaking from the back surface side of the light guide plate 31, and feeds the light into the light guide plate 31. The reflective sheet 36 has, for example, a function to diffuse light and a function to scatter light, in addition to the reflection function. Disposing the reflective sheet 36 on the back surface side of the light guide plate 31 allows the backlight device 3 to efficiently use the light emitted from the light source unit 32 and entering the light guide plate 31, and to improve the luminance of the light emitted by the backlight device 3. The reflective sheet 36 is made of foamed polyethylene terephthalate (PET), for example. The reflective sheet 36 may be made of an evaporated silver film, a multilayer reflective film, or white PET, for example.

The housing 37 accommodates the light guide plate 31, the light source unit 32, the light source control FPC 33, the diffusion sheet 34, the prism sheet 35, and the reflective sheet 36. The housing 37 is formed of a plate-like metal (i.e., a sheet metal), for example. Two strips of the double-sided tape 38 are respectively disposed at the upper marginal portion 100*ue* (refer to FIG. 1) and the lower marginal portion 100*be* (refer to FIG. 1) of the display apparatus 100. The double-sided tape 38 fixes the prism sheet 35 to the resin portion 39 at the upper marginal portion 100*ue* of the display apparatus 100. Although not illustrated, the double-sided tape 38 fixes the prism sheet 35 to the resin portion 39 at the lower marginal portion 100*be* of the display apparatus 100. The double-sided tape 38 at the lower marginal portion 100*be* of the display apparatus 100 covers a front surface of the light source control FPC 33. The double-sided tape 38 and the resin portion 39 will be specifically described later.

As illustrated in FIG. 2, the cover panel 7 covers and protects the front surface 1*a* of the display panel 1. The cover panel 7 has a rectangular, planer shape with four rounded corners, for example. The cover panel 7 is formed to be larger than the display panel 1 in a plan view, and a side surface of the cover panel 7 is located on an outer peripheral side of the display apparatus 100 than a side surface of the display panel 1. The cover panel 7 is formed of a glass plate or a resin plate. The cover panel 7 includes a translucent portion 71 facing the display region 10*a* of the display panel 1, and the light-shielding portion 72 surrounding the translucent portion 71 in a plan view. The light-shielding portion 72 is, for example, a region in which a light-shielding member 73 is disposed on the back surface of the glass plate or the resin plate. The translucent portion 71 serves as a display region of the display apparatus 100, and the light-shielding portion 72 serves as a frame region of the display apparatus 100. The adhesive layer 5 bonds the cover panel 7 to the front surface 1*a* of the display panel 1. The adhesive layer 5 is a member having high translucency and adhesiveness (stickiness), and is an ultraviolet-curable resin, for example. The adhesive layer 5 is formed to have the same shape and the same size as those of the second polarizing plate 14 in a plan view.

As illustrated in FIGS. 4 to 7, the housing 37 includes a bottom portion 371 and a wall portion 372 rising from the periphery of the bottom portion 371 toward the display panel 1 side. The wall portion 372 surrounds the bottom portion 371. The wall portion 372 has a thickness T of 0.1 mm, for example. The upper surface of the wall portion 372 of the housing 37 is located higher than the upper surface of prism sheet 35.

The resin portions 39 are respectively provided at the upper marginal portion 100*ue* and the lower marginal portion 100*be* of the display apparatus 100, and are disposed on an inner side of the housing 37 than the wall portion 372. The resin portion 39 is formed to be integrated with the housing 37 by an insert molding method, for example, and is called an insert mold. The insert molding method refers to a method of inserting a metallic component in a metal mold, and injecting a resin around the metallic component to integrate the metallic component with the resin. The upper surface of the resin portion 39 is located at the same height or substantially the same height as that of the upper surface of the prism sheet 35.

The double-sided tape 38 includes a first bonding surface 38*a* and a second bonding surface 38*b* which is the opposite side of the first bonding surface 38*a*. Two strips of the double-sided tape 38 are respectively disposed at the upper marginal portion 100*ue* and the lower marginal portion 100*be* of the display apparatus 100. Each strip of the double-sided tape 38 is sandwiched between the display panel 1 and the backlight device 3 at each of the upper marginal portion 100*ue* and the lower marginal portion 100*be* of the display apparatus 100. For example, the first bonding surface 38*a* of the double-sided tape 38 is bonded to each of the prism sheet 35 and the resin portion 39. The second bonding surface 38*b* of the double-sided tape 38 is bonded to the display panel 1. With this configuration, the double-sided tape 38 bonds the display panel 1 to the backlight device 3.

The first bonding surface 38a of the double-sided tape 38 is seamlessly stuck from the upper surface of the prism sheet 35 to the upper surface of the resin portion 39 at the upper marginal portion 100ue of the display apparatus 100. This configuration allows the prism sheet 35 to be fixed to the housing 37 through the double-sided tape 38 and the resin portion 39. The double-sided tape 38 has a light-shielding property. This property enables the blocking of the light emitted from the backlight device 3 toward the frame region 10b at the upper marginal portion 100ue and the lower marginal portion 100be of the display apparatus 100.

The side surfaces of a plurality of staked members constitute the side surface of the display panel 1. For example, the side surface of the first substrate 11, the side surface of the first polarizing plate 12, the side surface of the second substrate 13, and the side surface of the second polarizing plate 14 constitute the side surface of the display panel 1. In the first embodiment, the side surface of the first polarizing plate 12 is located on an inner side of the display panel 1 than the side surface of the first substrate 11.

Figure 8:
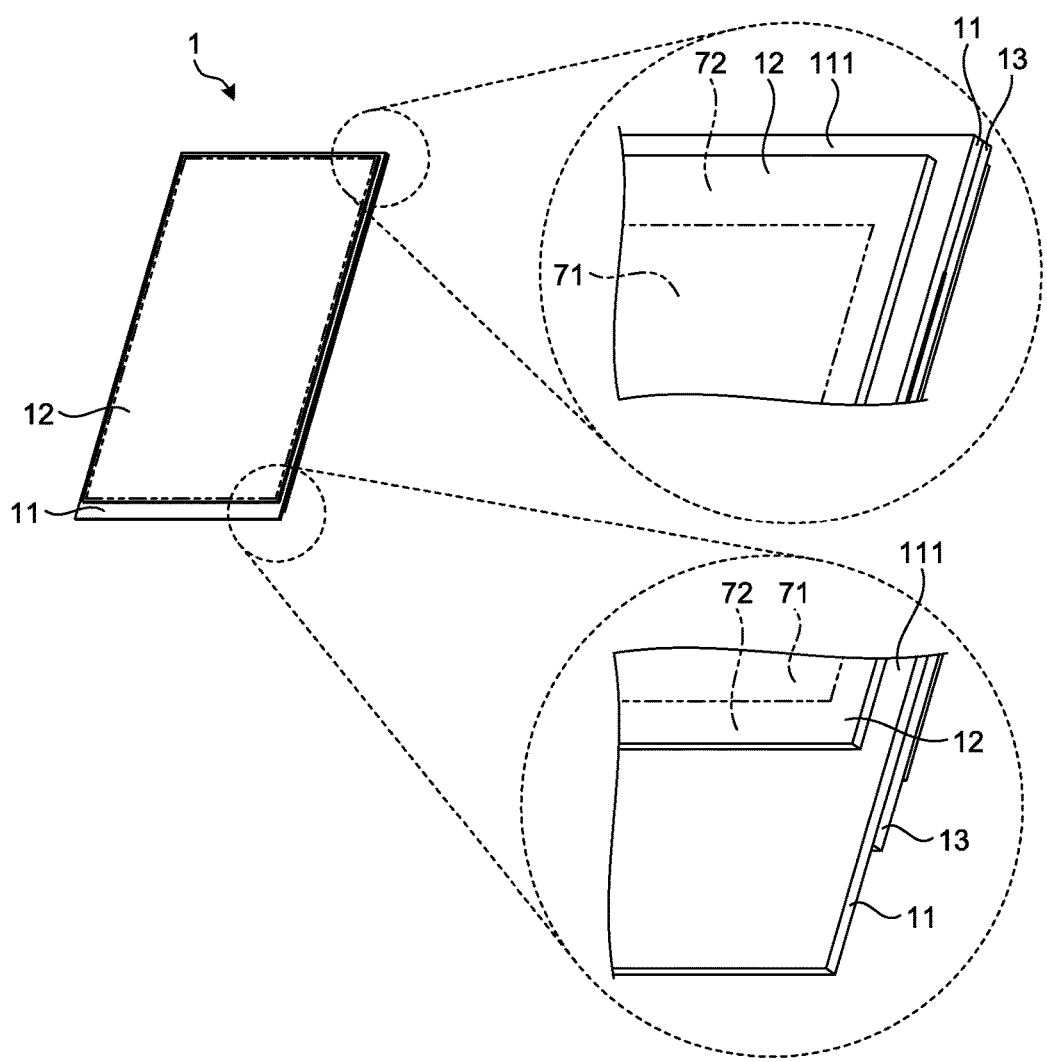
FIG. 8 includes a perspective view illustrating a back surface of the display panel according to the first embodiment, and enlarged views illustrating parts of the back surface.
Figure 9:
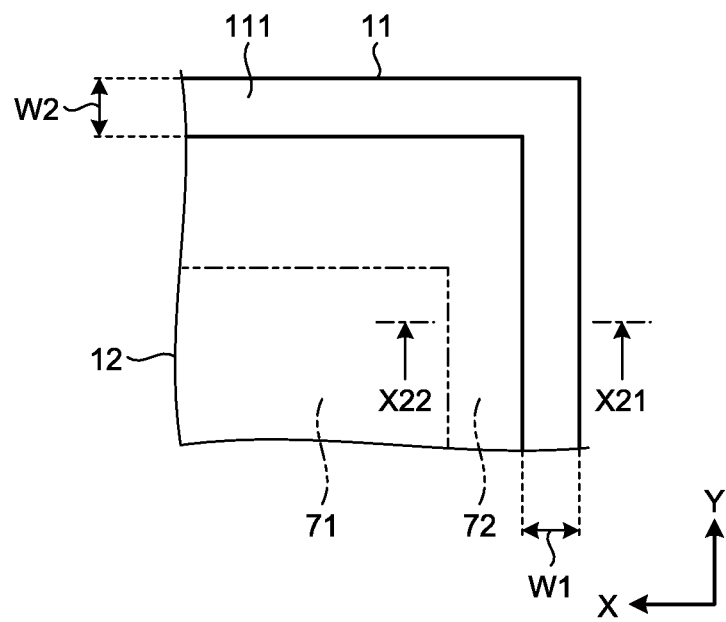
FIG. 9 is a plan view illustrating a peripheral region to which adhesive is applied according to the first embodiment.
Figure 10:
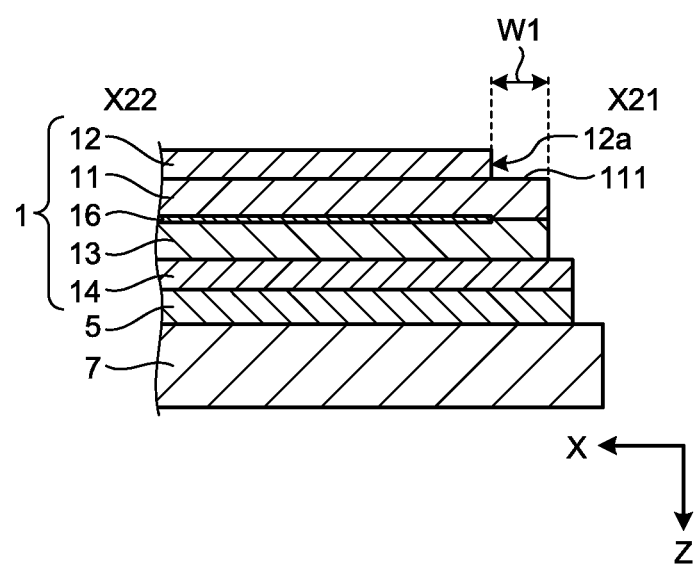
FIG. 10 is a view illustrating a cross-section taken along line X21-X22 in FIG. 9.

FIG. 8 includes a perspective view illustrating the back surface of the display panel according to the first embodiment, and enlarged views illustrating parts of the back surface. FIG. 9 is a plan view illustrating a peripheral region to which adhesive is applied according to the first embodiment. FIG. 10 is a view illustrating a cross-section taken along line X21-X22 in FIG. 9. In FIG. 10, the front surface of the display panel 1 faces downward, and the back surface of the display panel 1 faces upward.

As illustrated in FIGS. 8 to 10, the back surface of the first substrate 11 has a peripheral region 111. The peripheral region 111 is exposed from the first polarizing plate 12, and difference in level is formed between the first polarizing plate 12 and the peripheral region 111, which corresponds to the thickness of the first polarizing plate 12. Assume that W1 denotes the width of the peripheral region 111 parallel to the Y-axis direction, and W2 denotes the width of the peripheral region 111 parallel to the X-axis direction at the upper marginal portion 100ue, the right marginal portion 100re, and a left marginal portion 100le of the display apparatus 100. If W1=W2=0.2 mm (typical value) is satisfied, for example, W1 is 0.13 mm to 0.27 mm, and W2 is 0.13 mm to 0.27 mm. As illustrated in FIG. 5, at the upper marginal portion 100ue of the display apparatus 100, the wall portion 372 of the housing 37 is located on the outer peripheral side of the display apparatus 100 than the side surface of the first polarizing plate 12. The upper surface of the resin portion 39 faces the peripheral region 111 of the first substrate 11. The adhesive member 4 is disposed between the peripheral region 111 of the first substrate 11 and the upper surface of the resin portion 39, and adheres to the first substrate 11, the double-sided tape 38, and the resin portion 39. With this configuration, the adhesive member 4 bonds the first substrate 11, the double-sided tape 38, and the resin portion 39 to one another.

The strip of the double-sided tape 38 is located on an inner side of the housing 37 than an outer side surface 39a of the resin portion 39, for example. A part of the resin portion 39 is exposed from underneath the strip of the double-sided tape 38, and the adhesive member 4 is in contact with the exposed part. With this configuration, the adhesive member 4 is in contact with the resin portion 39, which allows the adhesive member 4 to bond the display panel 1 to the backlight device 3 even if the adhesive strength between the adhesive member 4 and the double-sided tape 38 is low. The adhesive member 4 has a light-shielding property, and covers a side surface 12a of the first polarizing plate 12. This configuration allows the adhesive member 4 to prevent light leakage from the side surface 12a of the first polarizing plate 12.

As illustrated in FIG. 6, at the right marginal portion 100re of the display apparatus 100, the wall portion 372 of the housing 37 is located on an outer peripheral side of the display apparatus 100 than the side surface of the first polarizing plate 12. The upper surface of the wall portion 372 faces the peripheral region of the first substrate 11. The adhesive member 4 is disposed between the peripheral region 111 of the first substrate 11 and the upper surface of the wall portion 372, and adheres to the first substrate 11 and the wall portion 372. With this configuration, the adhesive member 4 fixes the first substrate 11 and the housing 37 to each other.

The adhesive member 4 also covers the side surface 12a of the first polarizing plate 12 at the right marginal portion 100re in the same manner as at the upper marginal portion 100ue of the display apparatus 100. This configuration allows the adhesive member 4 to prevent light leakage from the side surface 12a of the first polarizing plate 12. Although not illustrated, the adhesive member 4 is also disposed between the peripheral region 111 of the first substrate 11 and the upper surface of the wall portion 372 at the left marginal portion 100le of the display apparatus 100, in the same manner as at the right marginal portion 100re, and covers the side surface 12a of the first polarizing plate 12. The adhesive member 4 is disposed, among the outer peripheral sides of the display region 10a in a plan view, at the sides not provided with the light source unit 32, but is not disposed at the side provided with the light source unit 32.

The adhesive member 4 is formed of, for example, polyurethane-based moisture curable hot-melt adhesive, polyurethane-based moisture and ultraviolet curable hot-melt adhesive, or polyurethane-based ultraviolet and heat curable hot-melt adhesive.

Figure 11:
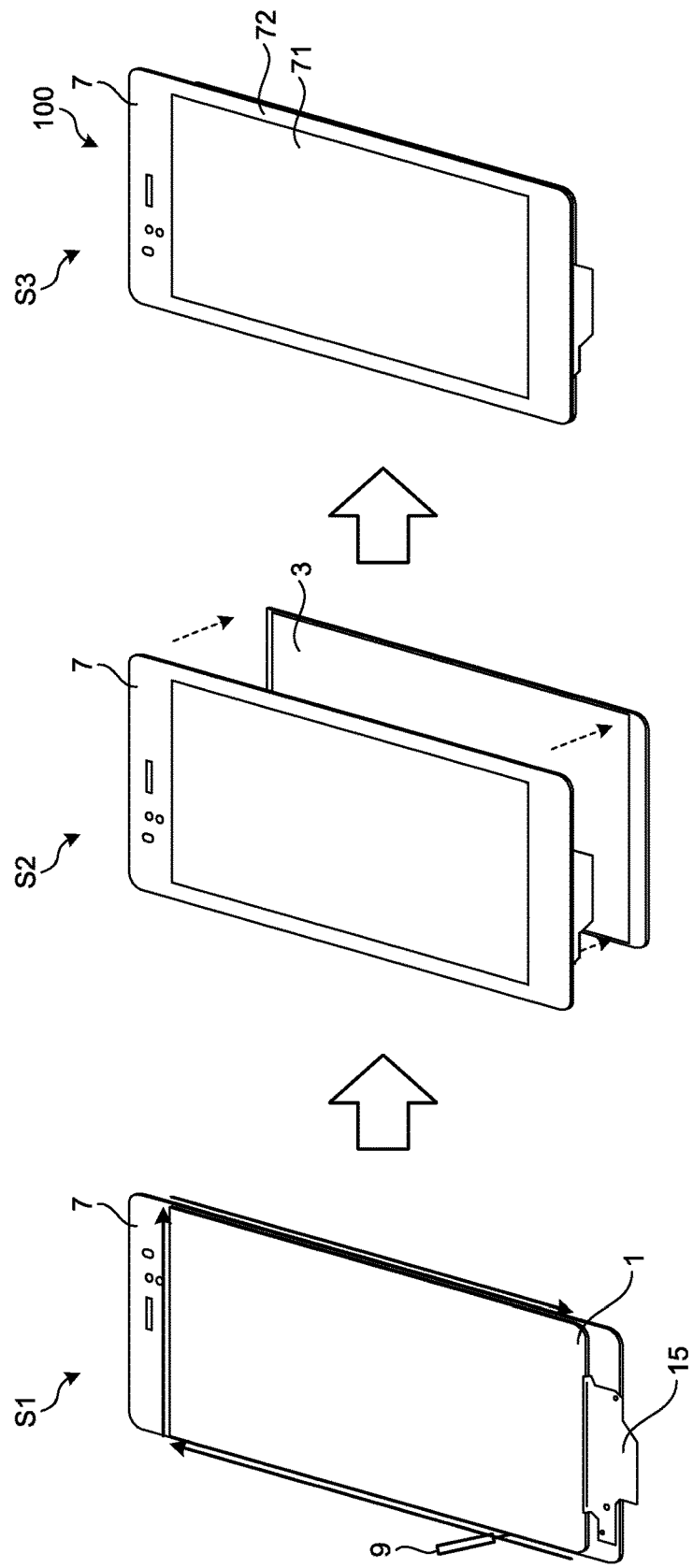
FIG. 11 is a schematic view illustrating a method for manufacturing the display apparatus according to the first embodiment in a sequence of processes.
Figure 12:
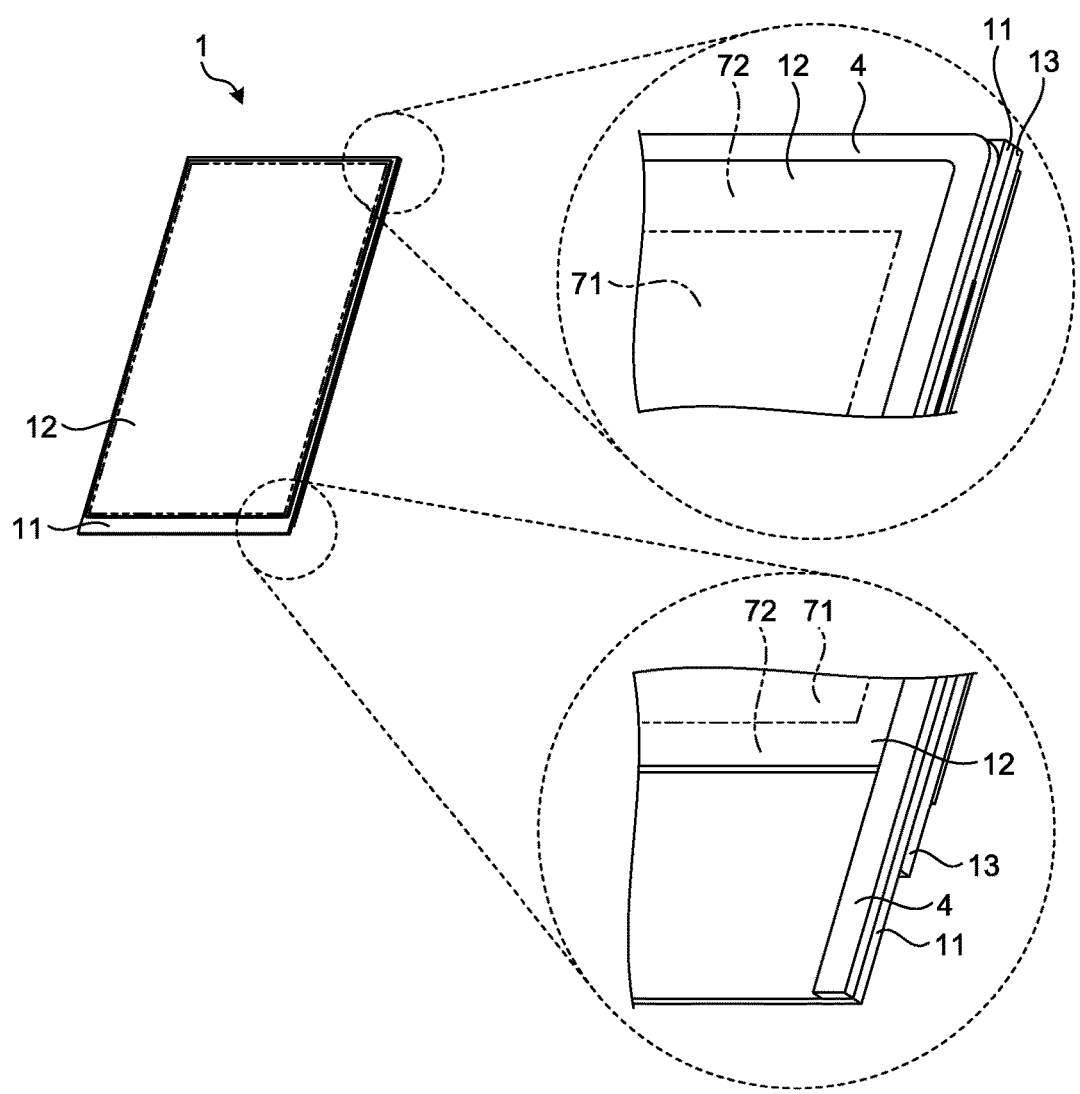
FIG. 12 includes a perspective view illustrating the back surface of the display panel after the adhesive is applied thereto, and enlarged views illustrating parts of the back surface.
Figure 13:
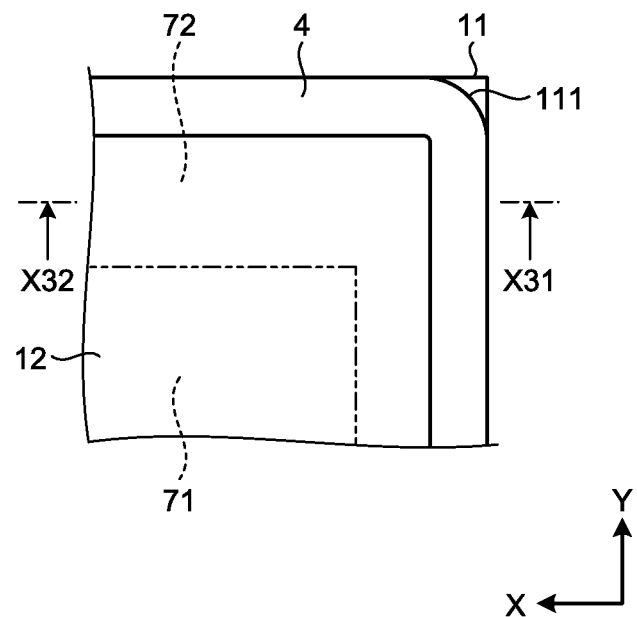
FIG. 13 is a plan view illustrating the peripheral region after the adhesive is applied thereto according to the first embodiment.
Figure 14:
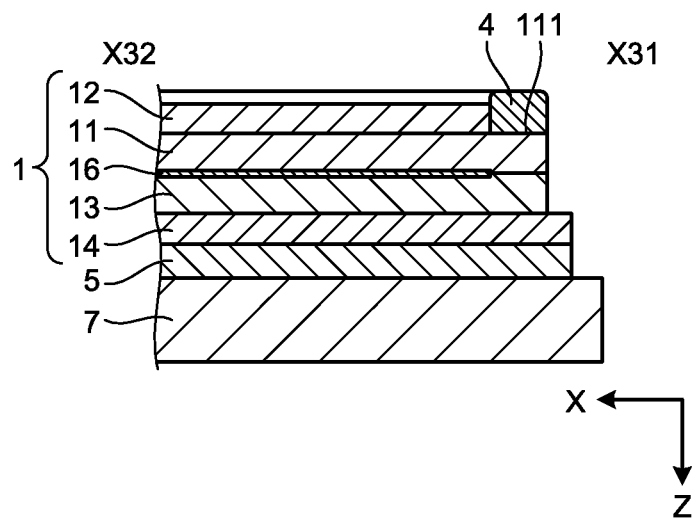
FIG. 14 is a view illustrating a cross-section taken along line X31-X32 in FIG. 13.

FIG. 11 is a schematic view illustrating a method for manufacturing the display apparatus according to the first embodiment in a sequence of processes. FIG. 12 includes a perspective view illustrating the back surface of the display panel after the adhesive is applied thereto, and enlarged views illustrating parts of the back surface. FIG. 13 is a plan view illustrating the peripheral region after the adhesive is applied thereto according to the first embodiment. FIG. 14 is a view illustrating a cross-section taken along line X31-X32 in FIG. 13. In FIG. 14, the front surface of the display panel 1 faces downward, and the back surface of the display panel 1 faces upward. As illustrated in FIG. 11, the method for manufacturing the display apparatus 100 according to the first embodiment includes a process of applying adhesive for the adhesive member 4 (Step S1), a process of bonding the display panel 1 to the backlight device 3 (Step S2), and a process of curing the adhesive for the adhesive member 4 (Step S3).

At Step S1, a manufacturing apparatus applies the adhesive for the adhesive member 4 to the peripheral region 111 on the back surface of the display panel 1 (refer to FIG. 8, for example). The manufacturing apparatus includes, for example, a nozzle 9 for discharging the adhesive for the adhesive member 4 that has been melted by heating. The distal end of the nozzle 9 is sufficiently smaller than the widths W1 and W2 of the peripheral region 111 (refer to FIGS. 9 and 10, for example). The manufacturing apparatus places the distal end of the nozzle 9 to face the peripheral region 111, and moves the nozzle 9 along the sides not provided with the light source unit 32 among the outer peripheral sides of the display panel 1 as indicated by arrows in Step S1, while discharging the adhesive for the adhesive member 4 from the distal end of the nozzle 9. In FIG. 11, the nozzle 9 is moved along the three outer peripheral sides of the display panel 1. The three outer peripheral sides of the display panel 1 are the left and right sides and the upper side of the display panel 1. In this manner, the manufacturing apparatus applies the adhesive for the adhesive member 4 to the peripheral region 111 of the first substrate 11, as illustrated in FIGS. 12 to 14.

At Step S2, the manufacturing apparatus places the back surface 1b of the display panel 1, to which the adhesive for the adhesive member 4 is applied, to face a surface of the backlight device 3 on the side on which the prism sheet 35 is provided. The manufacturing apparatus then attaches the back surface 1b of the display panel 1 to the backlight device 3. At Step S3, the manufacturing apparatus cures the adhesive for the adhesive member 4. For example, if the polyurethane-based moisture curable hot-melt adhesive is used for the adhesive member 4, the manufacturing apparatus cures the adhesive for the adhesive member 4 by letting the display panel 1 and the backlight device 3 bonded together at Step S2 stand in an environment containing moisture for a predetermined period of time. In this case, the environment containing moisture is controlled within a preset range. In this manner, the back surface 1b of the display panel 1 is bonded to the housing 37 of the backlight device 3. The display apparatus 100 is completed through the above-described processes.

As described above, according to the display apparatus 100 of the first embodiment, the adhesive member 4 is disposed between the display panel 1 and the wall portion 372. For example, the display panel 1 includes the peripheral region 111 where the back surface of the first substrate 11 is exposed from the first polarizing plate 12. At the left marginal portion 100le and the right marginal portion 100re of the display apparatus 100, the adhesive member 4 is disposed between the peripheral region 111 and the wall portion 372.

With this configuration, the bonding region of the display panel 1 and the backlight device 3 overlaps the peripheral region 111 of the display panel 1 in a plan view. No adhesive member needs to be disposed on the side surface of the display panel 1 to bond the display panel 1 to the backlight device 3, so that the distance between the side surface of the display panel 1 and the side surface of the cover panel 7 can be reduced. This configuration can narrow the light-shielding portion 72 serving as the frame region of the display apparatus 100, thereby allowing the display apparatus 100 to have a narrower frame.

The side surface of the first polarizing plate 12 is covered with the light-shielding adhesive member 4. This configuration can shield the side surface of the first polarizing plate 12 from light, and thus can prevent leakage of light emitted from the backlight device 3 from the side surface of the display panel 1.

The backlight device 3 includes the resin portion 39 integrated with the wall portion 372. At the upper marginal portion 100ue of the display apparatus 100, the adhesive member 4 is disposed between the peripheral region 111 of the display panel 1 and the resin portion 39. This configuration can ensure a wide bonding area of the adhesive member 4, thereby increasing the adhesive strength between the display panel 1 and the backlight device 3.

The backlight device 3 includes strips of the double-sided tape 38 disposed at locations overlapping the frame region 10b in a plan view. The first bonding surface 38a of the double-sided tape 38 is bonded to each of the prism sheet 35 and the resin portion 39. The second bonding surface 38b of the double-sided tape 38 is bonded to the display panel 1. With this configuration, the display panel 1 is bonded to the backlight device 3 with the double-sided tape 38, and thus the adhesive strength between the display panel 1 and the backlight device 3 can be increased. The double-sided tape 38 has a light-shielding property. This configuration can shield the frame region 10b of the display panel 1 from light emitted from the backlight device 3, and thus can prevent the light leakage.

In the first embodiment described above, the first substrate 11 corresponds to a substrate of the present disclosure; the first polarizing plate corresponds to a polarizing plate of the present disclosure; and the diffusion sheet 34 and the prism sheet 35 each correspond to an optical sheet of the present disclosure.

Modifications of First Embodiment

The first embodiment has been described above such that the resin portion 39 is disposed on the inner side of the housing 37 than the wall portion 372. The first embodiment has also been described above such that the adhesive member 4 is not disposed at the side provided with the light source unit 32 among the outer peripheral sides of the display region 10a in a plan view. In the embodiments of the present disclosure, however, the arrangement of the resin portion 39 and the arrangement of the adhesive member 4 are not limited to those described above.

First Modification of First Embodiment

Figure 15:
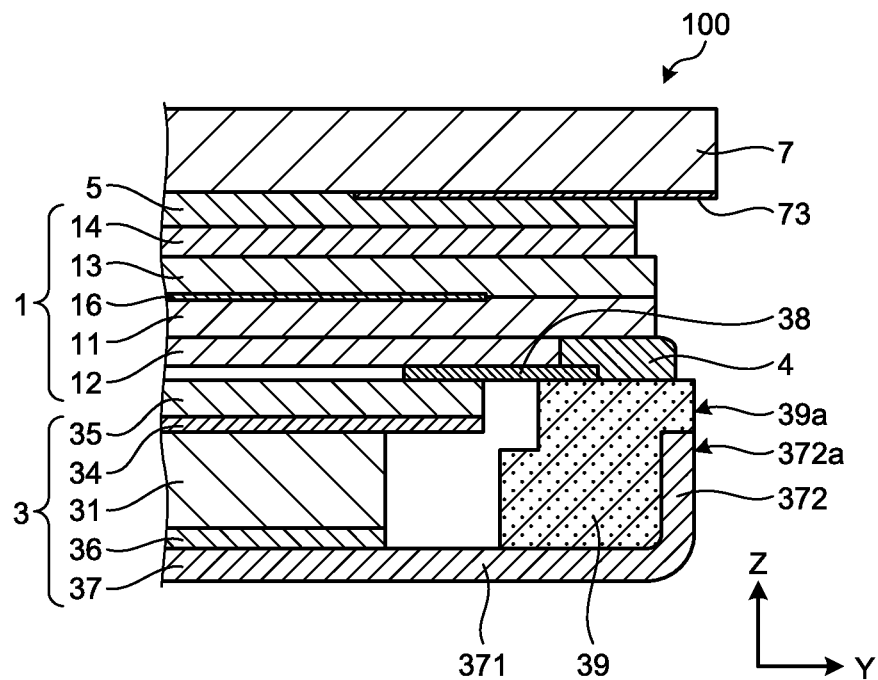
FIG. 15 is a sectional view illustrating the display apparatus according to a first modification of the first embodiment.
Figure 16:
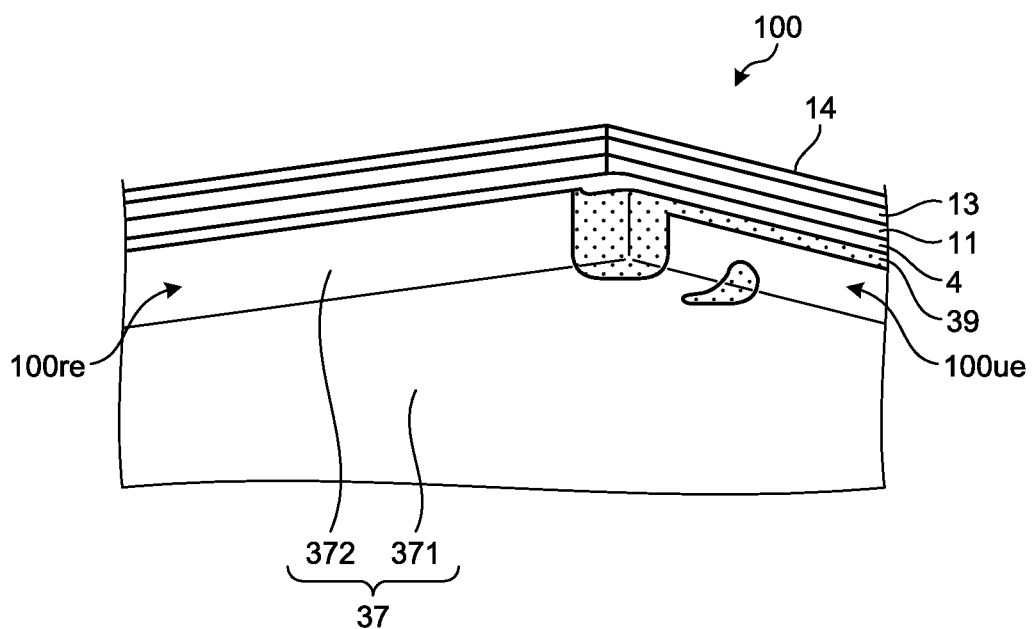
FIG. 16 is a perspective view illustrating a back surface side of the display apparatus according to the first modification of the first embodiment.
Figure 17:
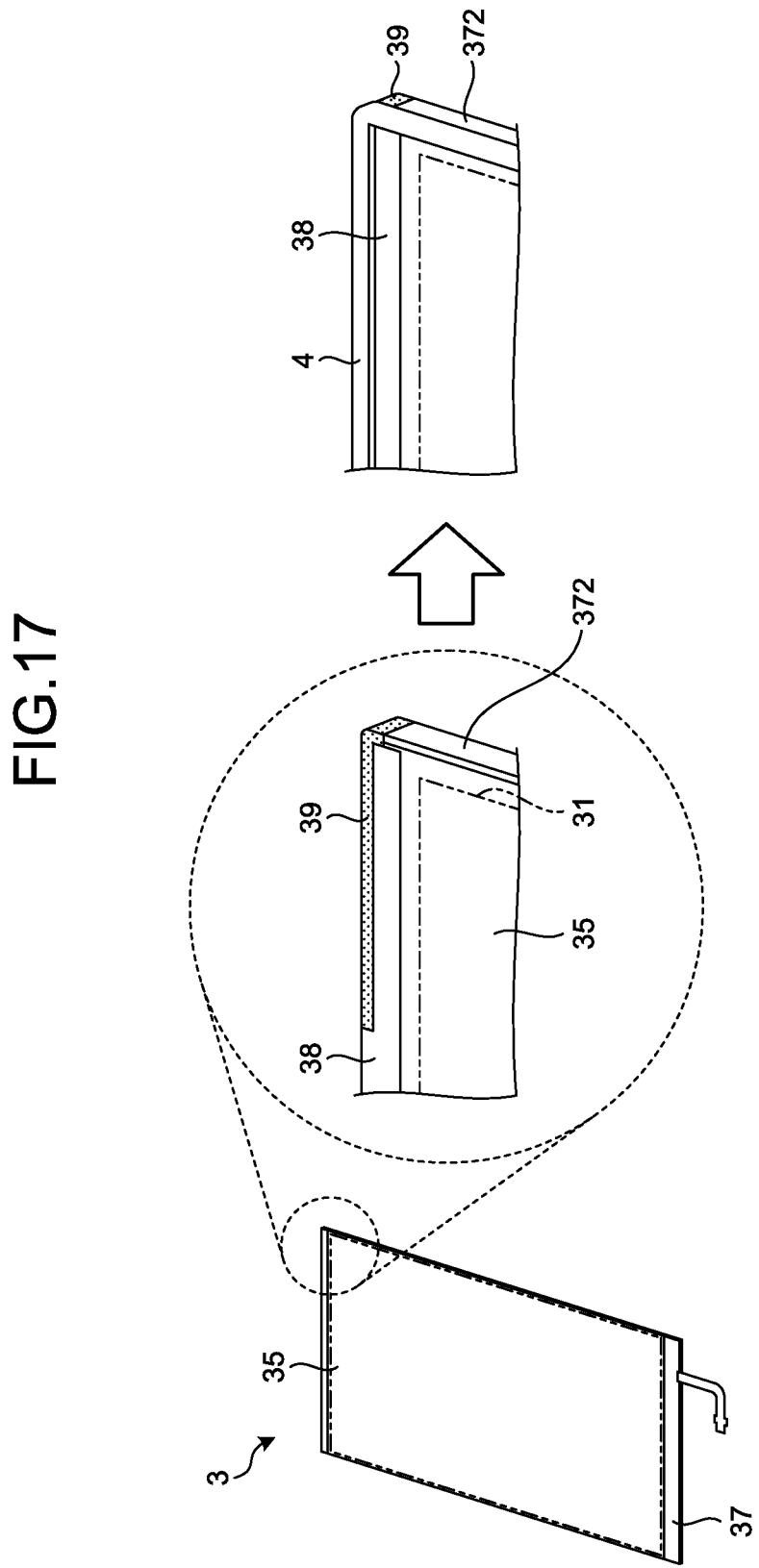
FIG. 17 includes enlarged schematic views illustrating a resin portion integrated with a wall portion and an adhesive member overlapping the resin portion in the backlight device according to the first modification of the first embodiment.

FIG. 15 is a sectional view illustrating the display apparatus according to a first modification of the first embodiment. FIG. 16 is a perspective view illustrating a back surface side of the display apparatus according to the first modification of the first embodiment. Specifically, FIG. 16 illustrates the right marginal portion 100re and the upper marginal portion 100ue of the display apparatus 100. FIG. 17 includes enlarged schematic views illustrating the resin portion integrated with the wall portion and the adhesive member overlapping the resin portion in the backlight device according to the first modification of the first embodiment. As illustrated in FIGS. 15 and 17, according to the first modification of the first embodiment, the resin portion 39 is continuously formed to overlap the bottom portion 371 and the wall portion 372 of the housing 37. The resin portion 39 is integrated with the wall portion 372. The adhesive 4 member is disposed between the resin portion 39 and the first substrate 11. The adhesive 4 member adheres to the resin portion 39. Also in this case, the bonding region of the display panel 1 and the backlight device 3 overlaps the peripheral region 111 of the display panel 1 in a plan view. This configuration according to the first modification of the first embodiment can also shorten the distance between the side surface of the display panel 1 and the side surface of the cover panel 7 in a plan view, thereby allowing the display apparatus 100 to have a narrower frame.

As illustrated in FIG. 15, according to the first modification, the strip of the double-sided tape 38 is also located on an inner side of the housing 37 than the outer side surface 39a of the resin portion 39, for example. A part of the resin portion 39 is exposed from underneath the strip of the double-sided tape 38, and the adhesive member 4 is in contact with the exposed part. With this configuration, the adhesive member 4 is in contact with the resin portion 39, which allows the adhesive member 4 to bond the display panel 1 to the backlight device 3 even if the adhesive strength between the adhesive member 4 and the double-sided tape 38 is low.

As illustrated in FIGS. 15 to 17, the resin portion 39 constitutes a part of the wall portion 372, and the outer side surface 39a of the resin portion 39 is flush with an outer side surface 372a of the wall portion 372, for example. With this configuration, using the insert molding method or the like can form, for example, a complicated concavo-convex shape and rounded corners, which are difficult to be processed by sheet metal processing. The first modification thus can provide the housing 37 well created with priority on design.

The first embodiment has been described above such that the resin portion 39 is disposed at each of the upper marginal portion 100ue and the lower marginal portion 100be of the display apparatus 100, but is not disposed at the right marginal portion 100re and the left marginal portion 100le of the display apparatus 100. In the embodiments of the present disclosure, however, the resin portion 39 may be disposed at the right marginal portion 100re, at the left marginal portion 100le, or at both the right marginal portion 100re and the left marginal portion 100le.

Second Modification of First Embodiment

Figure 18:
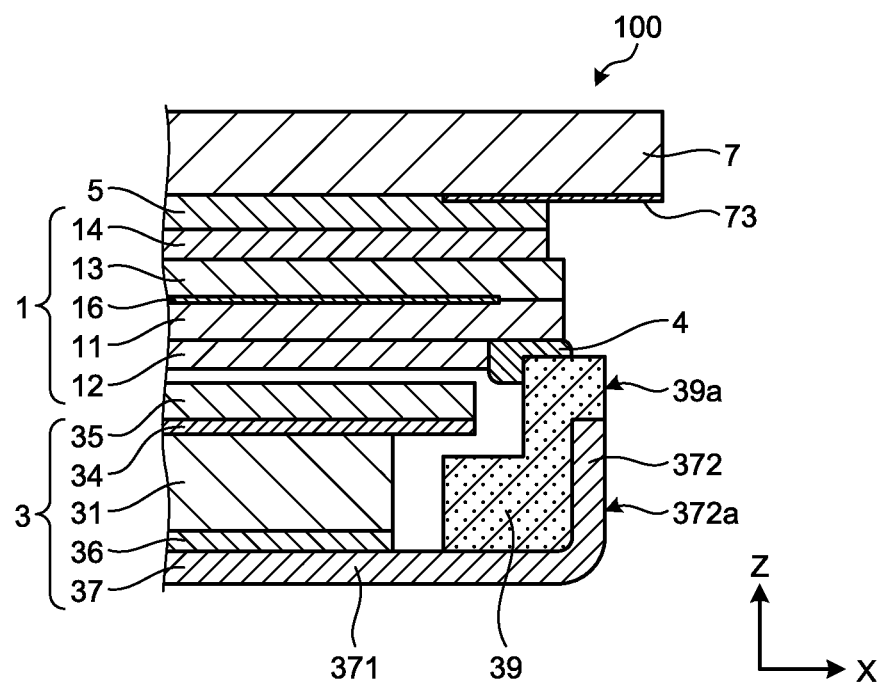
FIG. 18 is a sectional view illustrating the display apparatus according to a second modification of the first embodiment.

FIG. 18 is a sectional view illustrating the display apparatus according to a second modification of the first embodiment. Specifically, FIG. 18 illustrates the right marginal portion 100re of the display apparatus 100. As illustrated in FIG. 18, according to the second modification of the first embodiment, the resin portion 39 is disposed at the right marginal portion 100re of the display apparatus 100. Although not illustrated in FIG. 18, the resin portion 39 is also disposed at the left marginal portion 100le of the display apparatus 100. The resin portion 39 is continuously disposed to overlap the bottom portion 371 and the wall portion 372 of the housing 37, and the outer side surface 39a of the resin portion 39 is flush with the outer side surface 372a of the wall portion 372.

Also in this case, the bonding region of the display panel 1 and the backlight device 3 overlaps the peripheral region 111 of the display panel 1 in a plan view, at the right marginal portion 100re and the left marginal portion 100le. The second modification of the first embodiment also can shorten the distance between the side surface of the display panel 1 and the side surface of the cover panel 7 in a plan view, thereby allowing the light-shielding portion 72 serving as the frame region of the display apparatus 100 to be narrower. This allows the display apparatus 100 to have a narrower frame. In the first embodiment described above, the adhesive member 4 may be disposed at the lower marginal portion 100be of the display panel 1.

Third Modification of First Embodiment

Figure 19:
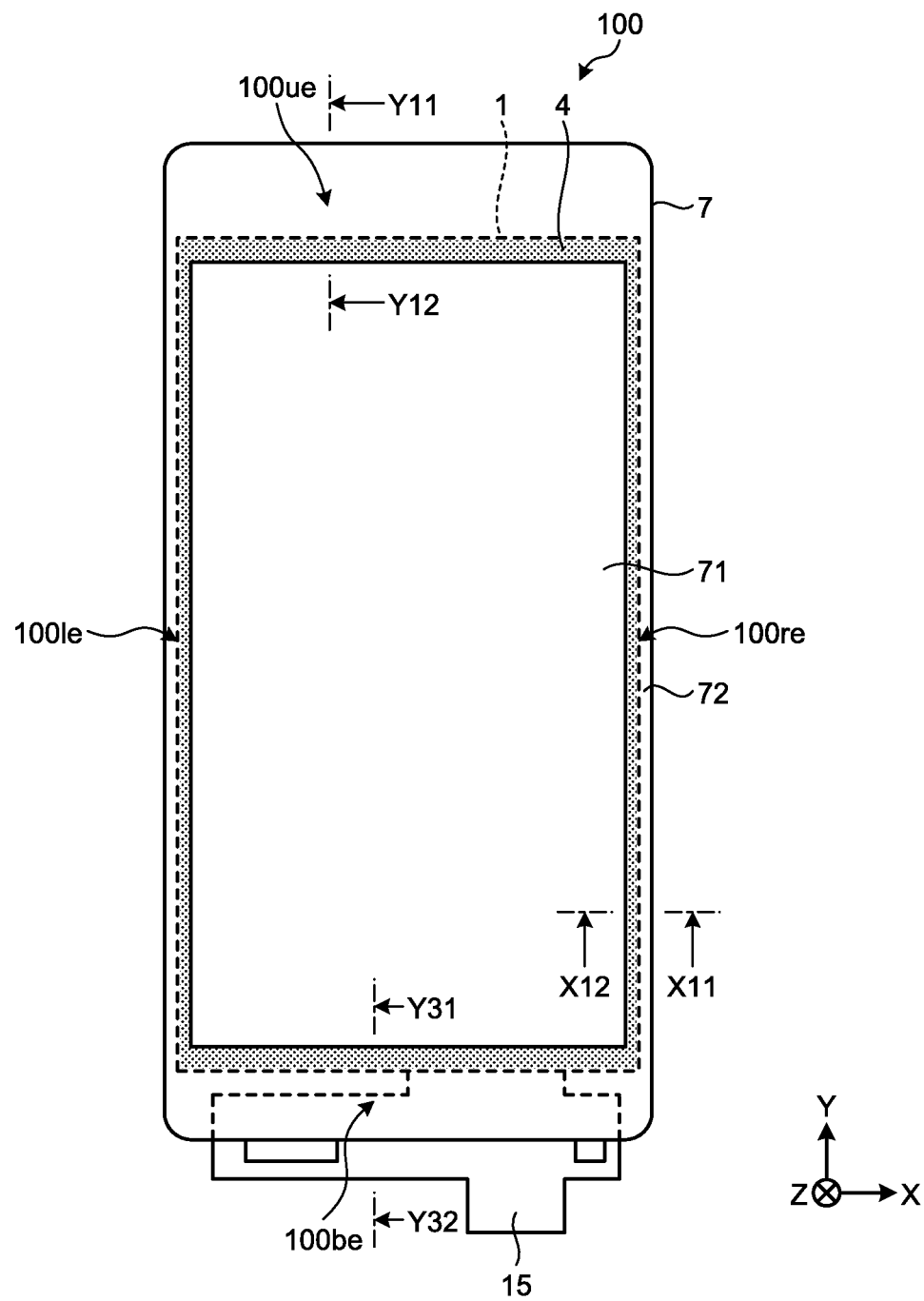
FIG. 19 is a plan view illustrating a configuration example of the display apparatus according to a third modification of the first embodiment.
Figure 20:
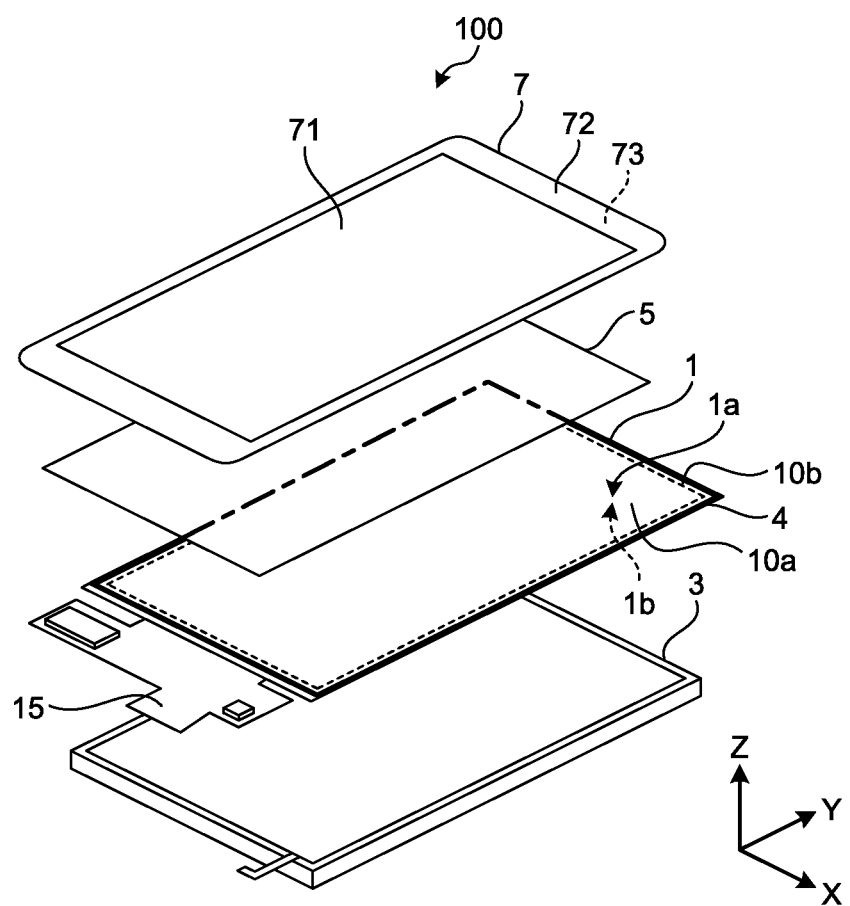
FIG. 20 is an exploded perspective view illustrating the configuration example of the display apparatus according to the third modification of the first embodiment.
Figure 21:
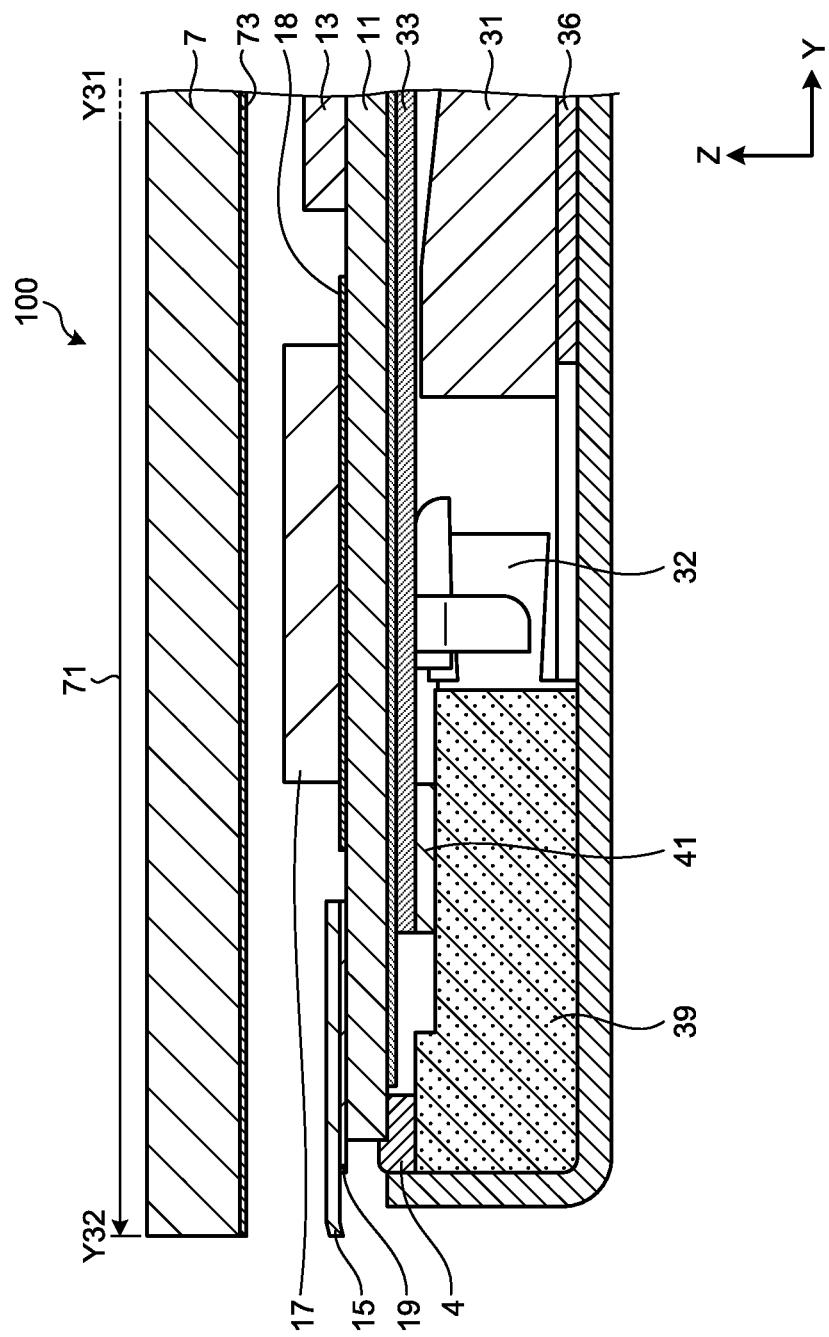
FIG. 21 is a partial sectional view of the display apparatus according to the third modification of the first embodiment.
Figure 22:
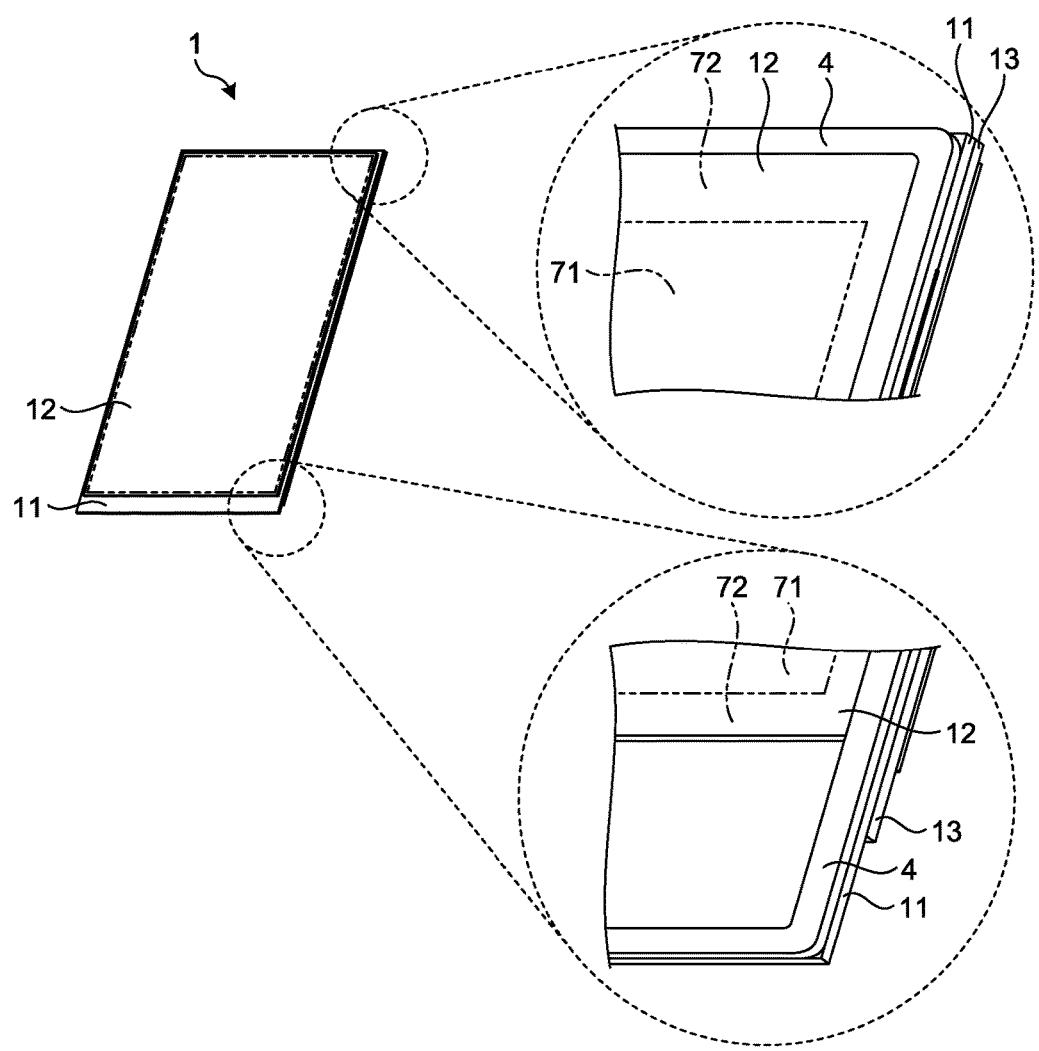
FIG. 22 includes a perspective view illustrating the back surface of the display panel according to the third modification of the first embodiment, and enlarged views illustrating parts of the back surface.

FIG. 19 is a plan view illustrating a configuration example of the display apparatus according to a third modification of the first embodiment. FIG. 20 is an exploded perspective view illustrating the configuration example of the display apparatus according to the third modification of the first embodiment. FIG. 21 is a partial sectional view of the display apparatus according to the third modification of the first embodiment. Specifically, FIG. 21 illustrates a cross-section obtained by cutting the lower marginal portion 100be of the display apparatus 100 illustrated in FIG. 19 along line Y31-Y32. FIG. 22 includes a perspective view illustrating the back surface of the display panel according to the third modification of the first embodiment, and enlarged views illustrating parts of the back surface. As illustrated in FIGS. 19 to 22, according to the third modification of the first embodiment, the adhesive member 4 is also applied to the side provided with the light source unit 32 in the outer periphery of the display apparatus 100. In FIGS. 19 to 22, the adhesive member 4 is disposed not only at the upper marginal portion 100ue, the right marginal portion 100re, and the left marginal portion 100le of the display apparatus 100, but also at the lower marginal portion 100be thereof. The adhesive member 4 is also disposed between the first substrate 11 and the resin portion 39 at the lower marginal portion 100be, and bonds the display panel 1 to the backlight device 3.

According to the third modification of the first embodiment, in the process of applying the adhesive for the adhesive member 4, the melted adhesive is applied to the peripheral region 111 of the display panel 1 (refer to FIG. 9, for example) at the lower marginal portion 100be, in addition to the upper marginal portion 100ue, the right marginal portion 100re, and the left marginal portion 100le of the display apparatus 100. For example, the manufacturing apparatus moves the nozzle 9 along four sides of the outer periphery of the display panel 1 while discharging the adhesive for the adhesive member 4 from the distal end of the nozzle 9 (refer to FIG. 11). The four sides of the outer periphery of the display panel 1 are the right and left sides and the upper and lower sides of the display panel 1. In this manner, the manufacturing apparatus applies the adhesive for the adhesive member 4 to the peripheral region 111 of the first substrate 11. The manufacturing apparatus then performs Step S2 and Step S3 illustrated in FIG. 11. In this manner, the manufacturing apparatus can seamlessly form the adhesive member 4 at the four sides of the outer periphery of the display panel 1.

According to the third modification of the first embodiment, the adhesive member 4 is disposed along all the sides of the outer periphery of the display region 10a in a plan view, and the adhesive member 4 surrounds the display region 10a of the display panel 1 in a plan view. The display panel 1 and the backlight device 3 are sealed with the adhesive member 4 at the upper marginal portion 100ue, the right marginal portion 100re, the left marginal portion 100le, and the lower marginal portion 100be. This configuration can prevent entry of water and dust into the display apparatus 100 from between the display panel 1 and the backlight device 3, and thus can enhance dustproof and waterproof effects of the display apparatus 100.

The resin portion 39 may be continuously disposed to overlap the bottom portion 371 and the wall portion 372 of the housing 37, at the lower marginal portion 100be of the display apparatus 100. At the lower marginal portion 100be, the resin portion 39 may constitute a part of the wall portion 372, and the outer side surface 39a of the resin portion 39 may be flush with the outer side surface 372a of the wall portion 372.

Figure 23:
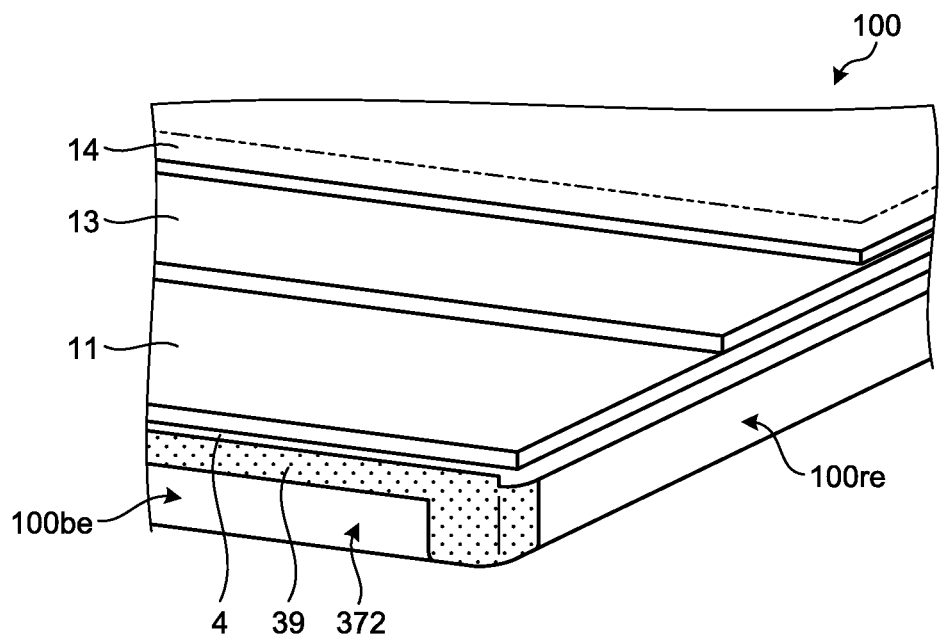
FIG. 23 is a perspective view illustrating a front surface side of the display apparatus according to the third modification of the first embodiment.
Figure 24:
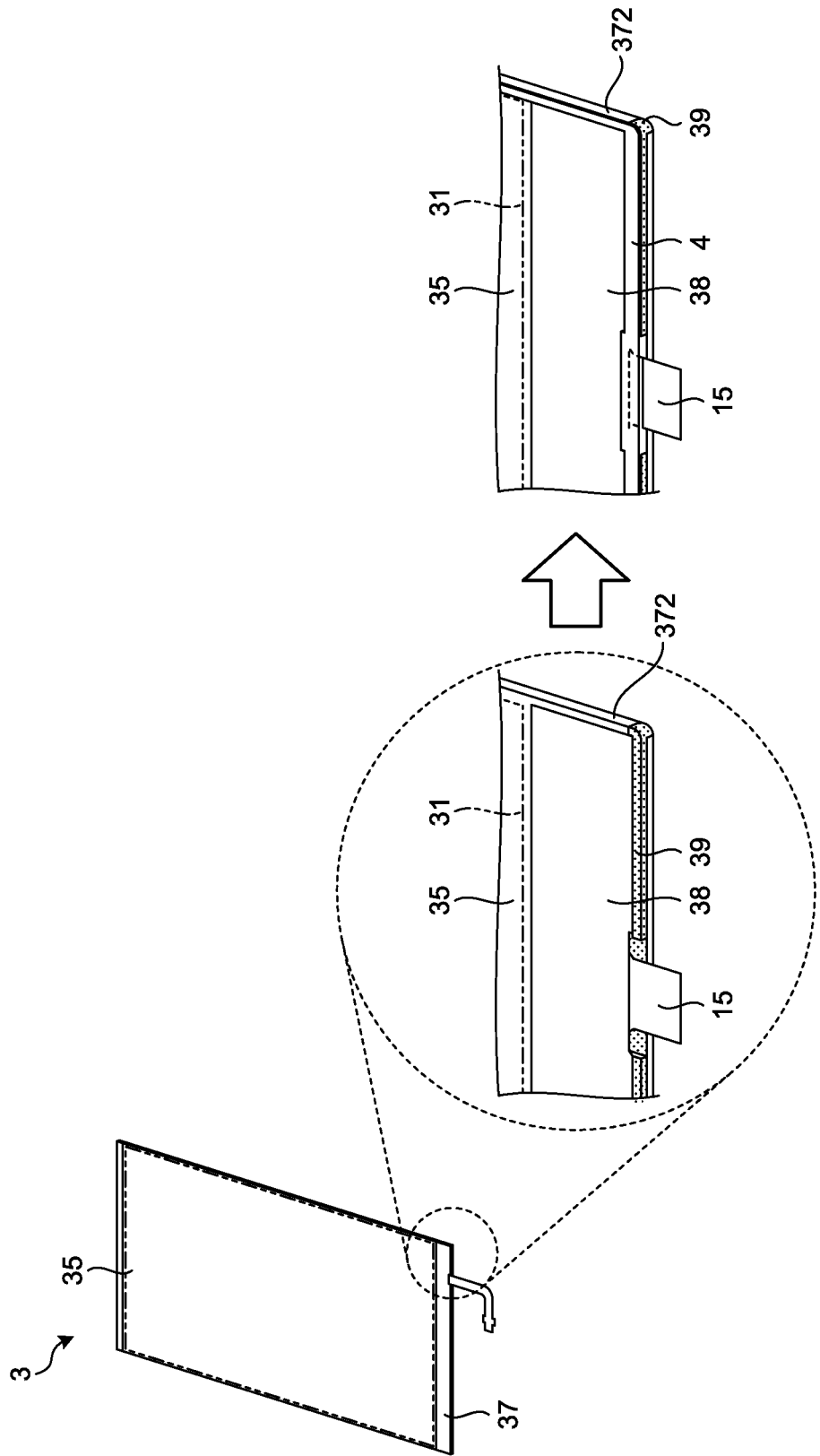
FIG. 24 includes enlarged schematic views illustrating the resin portion integrated with the wall portion and the adhesive member overlapping the resin portion in the backlight device according to the third modification of the first embodiment.

FIG. 23 is a perspective view illustrating the front surface side of the display apparatus according to the third modification of the first embodiment. Specifically, FIG. 23 illustrates the right marginal portion 100re and the lower marginal portion 100be of the display apparatus 100. FIG. 24 includes enlarged schematic views illustrating the resin portion integrated with the wall portion and the adhesive member overlapping the resin portion in the backlight device according to the third modification of the first embodiment. As illustrated in FIGS. 23 and 24, at the lower marginal portion 100be of the display apparatus 100, the resin portion 39 is continuously disposed to overlap the bottom portion 371 and the wall portion 372 of the housing 37, and the outer side surface 39a of the resin portion 39 is flush with the outer side surface 372a of the wall portion 372. At the lower marginal portion 100be, the adhesive member 4 is disposed between the resin portion 39 and the first substrate 11.

Second Embodiment

Figure 25:
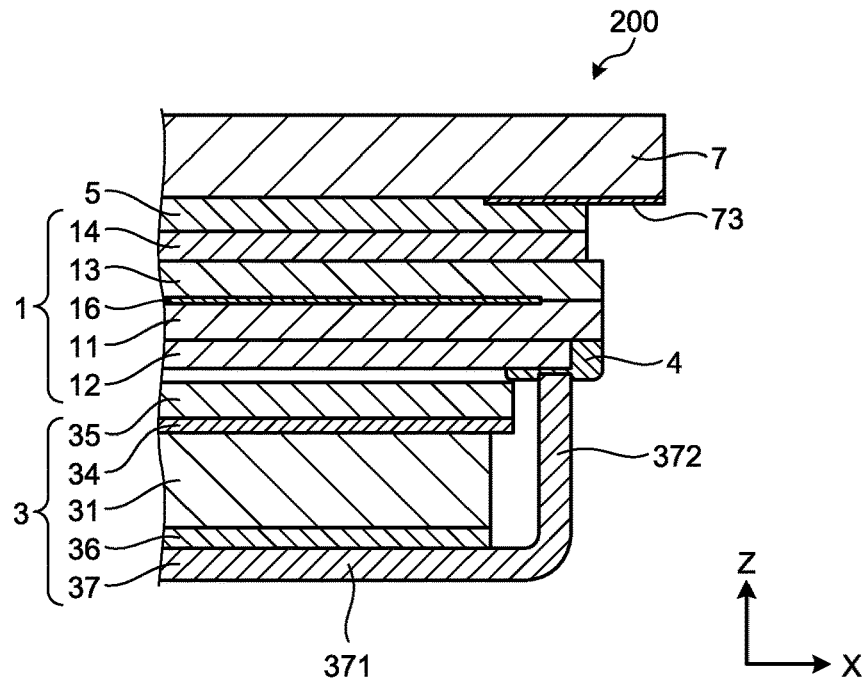
FIG. 25 is a sectional view illustrating a configuration example of a display apparatus according to a second embodiment of the present disclosure.

FIG. 25 is a sectional view illustrating a configuration example of a display apparatus according to a second embodiment of the present disclosure. Specifically, FIG. 25 illustrates a right marginal portion of a display apparatus 200 according to the second embodiment. As illustrated in FIG. 25, in the display apparatus 200, a wall portion 372 of a housing 37 and a first polarizing plate 12 of a display panel 1 face each other. An adhesive member 4 is disposed between the first polarizing plate 12 and the wall portion 372. Although not illustrated, the adhesive member 4 is also disposed between the first polarizing plate 12 and the wall portion 372 at a left marginal portion and an upper marginal portion of the 200. With this configuration, a bonding region of the display panel 1 and a backlight device 3 overlaps a frame region 10b of the display panel 1 in a plan view. This eliminates the necessity of disposing an adhesive member on the side surface of the display panel 1 to bond the display panel 1 to the backlight device 3, thereby shortening a distance between the side surface of the display panel 1 and the side surface of a cover panel 7. As a result, the configuration allows the display apparatus 200 to have a narrower frame.

Figure 26:
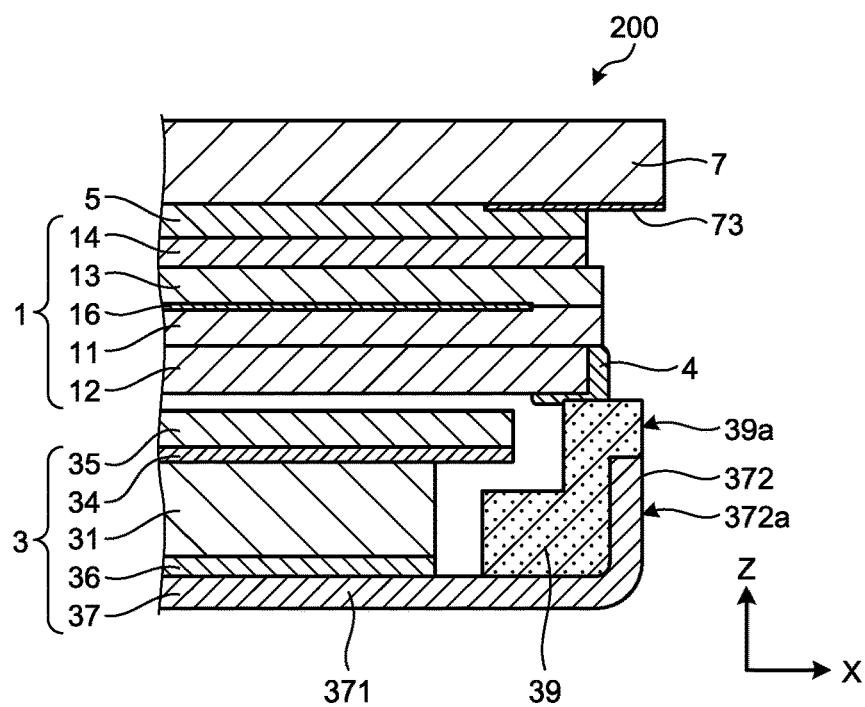
FIG. 26 is a sectional view illustrating a configuration example of the display apparatus according to a modification of the second embodiment.

The first to third modifications of the first embodiment can also be applied to the second embodiment. For example, a modification illustrated in FIG. 26 can be made in the second embodiment. FIG. 26 is a sectional view illustrating a configuration example of the display apparatus according to the modification of the second embodiment of the present disclosure. As illustrated in FIG. 26, according to the modification of the second embodiment, a resin portion 39 is disposed at the right marginal portion of the display apparatus 200. Although not illustrated in FIG. 26, the resin portion 39 is also disposed at the left marginal portion of the display apparatus 200. The resin portion 39 is continuously disposed to overlap a bottom portion 371 and the wall portion 372 of the housing 37, and an outer side surface 39a of the resin portion 39 is flush with an outer side surface 372a of the wall portion 372. Also in this case, at the right marginal portion and the left marginal portion, the bonding region of the display panel 1 and the backlight device 3 overlaps the frame region 10b of the display panel 1 in a plan view. This configuration allows the display apparatus 200 to have a narrower frame.

Third Embodiment

Figure 27:
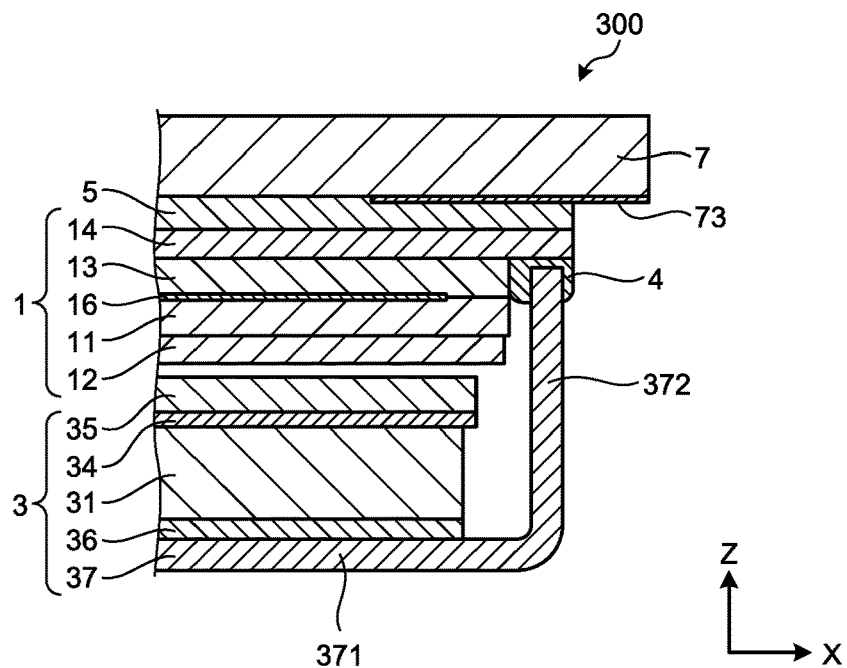
FIG. 27 is a sectional view illustrating a configuration example of a display apparatus according to a third embodiment of the present disclosure.

FIG. 27 is a sectional view illustrating a configuration example of a display apparatus according to a third embodiment of the present disclosure. Specifically, FIG. 27 illustrates a right marginal portion of a display apparatus 300 according to the third embodiment. As illustrated in FIG. 27, in the display apparatus 300, a second polarizing plate 14 of a display panel 1 projects towards an outer peripheral side of the display panel 1 than a first substrate 11, a first polarizing plate 12, and a light guide plate 31. The portion of the second polarizing plate 14 projecting toward the outer peripheral side and a wall portion 372 of a housing 37 face each other in the thickness direction of the display apparatus 300. An adhesive member 4 is disposed between the second polarizing plate 14 and the wall portion 372, and is in contact with the second polarizing plate 14 and the wall portion 372. Although not illustrated, the adhesive member 4 is also disposed between the second polarizing plate 14 and the wall portion 372 at a left marginal portion and an upper marginal portion of the display apparatus 300, and is in contact with the second polarizing plate 14 and the wall portion 372. With this configuration, a bonding region of the display panel 1 and a backlight device 3 overlaps the second polarizing plate 14 in a plan view. No adhesive member needs to be disposed on the side surface of the second polarizing plate 14. The wall portion 372 on which the adhesive member 4 is disposed has a small thickness T of about 0.1 mm, for example, which allows the display apparatus 300 to have a narrower frame.

Fourth Embodiment

Figure 28:
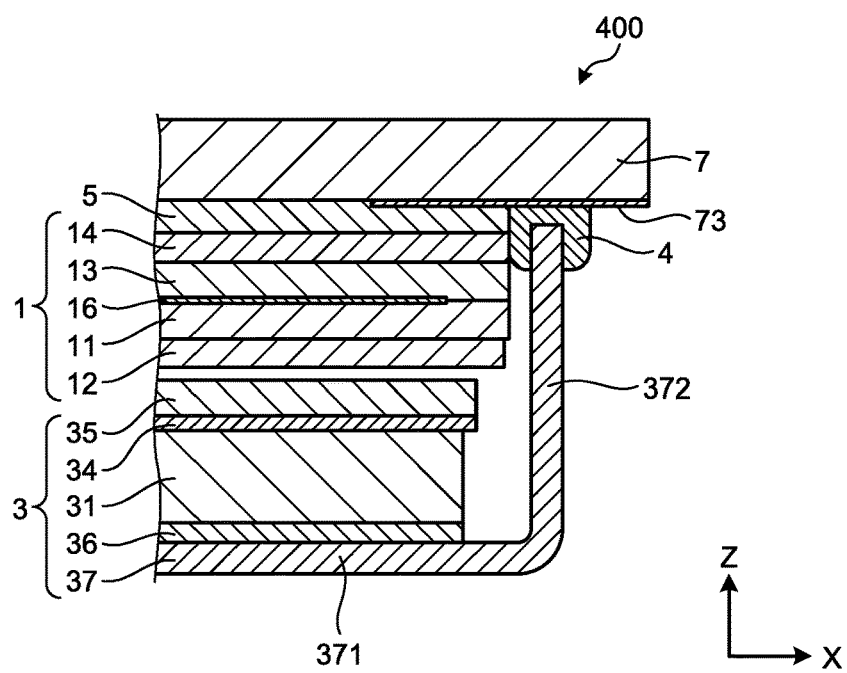
FIG. 28 is a sectional view illustrating a configuration example of a display apparatus according to a fourth embodiment of the present disclosure.

FIG. 28 is a sectional view illustrating a configuration example of a display apparatus according to a fourth embodiment of the present disclosure. Specifically, FIG. 28 illustrates a right marginal portion of a display apparatus 400 according to the fourth embodiment. As illustrated in FIG. 28, in the display apparatus 400, an adhesive member 4 is disposed between a cover panel 7 and a wall portion 372, and is in contact with the cover panel 7 and the wall portion 372. Although not illustrated, the adhesive member 4 is also disposed between the cover panel 7 and the wall portion 372 at a left marginal portion and an upper marginal portion of the display apparatus 400, and is in contact with the cover panel 7 and the wall portion 372. With this configuration, a bonding region of a display panel 1 and a backlight device 3 overlaps a light-shielding portion 72 of the display apparatus 400 in a plan view. The wall portion 372 on which the adhesive member 4 is disposed has a small thickness T of about 0.1 mm, for example, which allows the display apparatus 400 to have a narrower frame.

While the preferred embodiments of the present disclosure and the modifications thereof have been described above, the present disclosure is not limited to such embodiments and the modifications. The content disclosed in the embodiments and the modifications is merely an example, and can be variously modified within the scope not departing from the gist of the present disclosure. For example, although a transmissive liquid crystal display apparatus capable of color display exemplifies the display apparatus 100 of the first embodiment, the display apparatus of the present disclosure is not limited to the transmissive liquid crystal display apparatus supporting color display, and may be a transmissive liquid crystal display apparatus supporting monochrome display. Any modifications appropriately made within the scope not departing from the gist of the present disclosure naturally belong to the technical scope of the present disclosure.

The display apparatus of the present disclosure includes the following aspects.

(1) A display apparatus comprising:
    a display panel;
    a backlight device disposed on a back surface side of the display panel;
    an adhesive member bonding the display panel to the backlight device; and
    a housing covering a back surface side of the backlight device, wherein
    the housing comprises:

a bottom portion; and
a wall portion rising from a periphery of the bottom portion toward the display panel side, and
the adhesive member is disposed between the display panel and the wall portion.
(2) The display apparatus according to (1), wherein
the display panel comprises:
a substrate; and
a polarizing plate disposed on a back surface side of the substrate and facing the backlight device,
the back surface of the substrate includes a peripheral region exposed from the polarizing plate, and
the adhesive member is disposed between the peripheral region and the wall portion.
(3) The display apparatus according to (1), wherein
the display panel comprises:
a substrate; and
a polarizing plate disposed on a back surface side of the substrate and facing the backlight device, and
the adhesive member is disposed between the polarizing plate and the wall portion.
(4) The display apparatus according to (2) or (3), wherein
the adhesive member has a light-shielding property, and
a side surface of the polarizing plate is covered with the adhesive member.
(5) The display apparatus according to any one of (1) to (4), wherein
the display panel comprises:
a display region configured to display an image; and
a frame region located at an outer periphery of the display region, and
the adhesive member surrounds the display region in a plan view.
(6) The display apparatus according to any one of (1) to (4), wherein
the backlight device comprises a plurality of light source elements,
the display panel comprises:
a display region configured to display an image; and
a frame region located at an outer periphery of the display region,
the light source elements are arranged along one side among outer peripheral sides of the display region in a plan view, and
the adhesive member is not disposed at the one side among the outer peripheral sides of the display region in the plan view.
(7) The display apparatus according to any one of (1) to (4), wherein
the backlight device comprises a plurality of light source elements,
the display panel comprises:
a display region configured to display an image; and
a frame region located at an outer periphery of the display region,
the light source elements are arranged along one side among outer peripheral sides of the display region in a plan view, and
the adhesive member is disposed along all the outer peripheral sides of the display region in the plan view.
(8) The display apparatus according to any one of (1) to (7), wherein
the backlight device further comprises a resin portion integrated with the wall portion, and
the adhesive member adheres to the resin portion.
(9) The display apparatus according to (8), wherein
the backlight device further comprises:

a light guide plate accommodated in the housing;
an optical sheet accommodated in the housing and disposed between the light guide plate and the display panel; and
a strip of double-sided tape disposed at a location overlapping the display panel in a plan view,
the double-sided tape has a first bonding surface and a second bonding surface that is an opposite side of the first bonding surface,
the first bonding surface adheres to the optical sheet and the resin portion, and
the second bonding surface adheres to the display panel.
(10) The display apparatus according to (9), wherein the double-sided tape has a light-shielding property.
(11) The display apparatus according to (1), wherein
the display panel comprises:
a first substrate;
a second substrate facing the first substrate;
a liquid crystal layer disposed between the first substrate and the second substrate;
a first polarizing plate disposed on an opposite side of the liquid crystal layer with the first substrate interposed between the first polarizing plate and the liquid crystal layer, and facing the backlight device; and
a second polarizing plate disposed on an opposite side of the liquid crystal layer with the second substrate interposed between the second polarizing plate and the liquid crystal layer, and
the adhesive member is disposed between the second polarizing plate and the wall portion.
(12) A display apparatus comprising:
a display panel;
a translucent cover panel disposed on a front surface side of the display panel;
a backlight device disposed on a back surface side of the display panel; and
an adhesive member bonding the display panel to the backlight device, wherein
the backlight device comprises:
a light guide plate; and
a housing accommodating the light guide plate,
the housing comprises:
a bottom portion; and
a wall portion rising from a periphery of the bottom portion toward the display panel side, and
the adhesive member is disposed between the cover panel and the wall portion.

What is claimed is:
1. A display apparatus comprising:
a display panel;
a backlight device disposed on a back surface side of the display panel;
an adhesive member bonding the display panel to the backlight device; and
a housing covering a back surface side of the backlight device, wherein
the housing comprises:
a bottom portion; and
a wall portion rising from a periphery of the bottom portion toward the display panel side, and
the adhesive member is disposed between the display panel and the wall portion.
2. The display apparatus according to claim 1, wherein
the display panel comprises:
a substrate; and a polarizing plate disposed on a back surface side of the substrate and facing the backlight device, the back surface of the substrate includes a peripheral region exposed from the polarizing plate, and the adhesive member is disposed between the peripheral region and the wall portion.

3. The display apparatus according to claim 1, wherein the display panel comprises:

a substrate; and a polarizing plate disposed on a back surface side of the substrate and facing the backlight device, and the adhesive member is disposed between the polarizing plate and the wall portion.

4. The display apparatus according to claim 2, wherein the adhesive member has a light-shielding property, and a side surface of the polarizing plate is covered with the adhesive member.

5. The display apparatus according to claim 1, wherein the display panel comprises:

a display region configured to display an image; and a frame region located at an outer periphery of the display region, and the adhesive member surrounds the display region in a plan view.

6. The display apparatus according to claim 1, wherein the backlight device comprises a plurality of light source elements, the display panel comprises:

a display region configured to display an image; and a frame region located at an outer periphery of the display region, the light source elements are arranged along one side among outer peripheral sides of the display region in a plan view, and the adhesive member is not disposed at the one side among the outer peripheral sides of the display region in the plan view.

7. The display apparatus according to claim 1, wherein the backlight device comprises a plurality of light source elements, the display panel comprises:

a display region configured to display an image; and a frame region located at an outer periphery of the display region, the light source elements are arranged along one side among outer peripheral sides of the display region in a plan view, and the adhesive member is disposed along all the outer peripheral sides of the display region in the plan view.

8. The display apparatus according to claim 1, wherein the backlight device further comprises a resin portion integrated with the wall portion, and the adhesive member adheres to the resin portion.

9. The display apparatus according to claim 8, wherein the backlight device further comprises:

a light guide plate accommodated in the housing;

an optical sheet accommodated in the housing and disposed between the light guide plate and the display panel; and a strip of double-sided tape disposed at a location overlapping the display panel in a plan view, the double-sided tape has a first bonding surface and a second bonding surface that is an opposite side of the first bonding surface, the first bonding surface adheres to the optical sheet and the resin portion, and the second bonding surface adheres to the display panel.

10. The display apparatus according to claim 9, wherein the double-sided tape has a light-shielding property.

* * * * *